United States Patent [19]

Bass

[11] Patent Number: 5,375,058
[45] Date of Patent: Dec. 20, 1994

[54] SURFACE DETECTION SYSTEM FOR AIRPORTS

[75] Inventor: Michael Bass, Winter Springs, Fla.

[73] Assignee: University of Central Florida, Orlando, Fla.

[21] Appl. No.: 811,817

[22] Filed: Dec. 20, 1991

[51] Int. Cl.$^5$ .............................................. G06F 15/48
[52] U.S. Cl. .................................... 364/439; 364/427; 364/428; 73/178 T; 342/450; 342/454
[58] Field of Search ............... 364/443, 427, 428, 439, 364/456, 550; 73/178 R, 178 T; 342/450, 454, 456, 457; 340/947, 958; 244/114 R

[56] References Cited

U.S. PATENT DOCUMENTS

| | | | |
|---|---|---|---|
| 4,122,522 | 10/1978 | Smith | 73/178 T |
| 4,151,595 | 4/1979 | Pressiat | 364/439 |
| 4,818,349 | 11/1983 | Höfgen | 342/452 |
| 4,845,629 | 7/1989 | Murga | 364/439 |
| 4,989,084 | 1/1991 | Wetzel | 244/144 R |
| 5,027,114 | 6/1991 | Kawashima et al. | 340/958 |
| 5,268,698 | 12/1993 | Smith, Sr. et al. | 364/439 |

Primary Examiner—Gary Chin
Attorney, Agent, or Firm—Mueller and Smith

[57] ABSTRACT

A surface detection system for airport facilities is described wherein a plurality of infrared (IR) scanners as well as presence/absence detectors are located with respect to taxiways and runways of an airport complex. These devices are arranged to perform in conjunction with local processors to generate data from aircraft and ground based vehicles available from a bar coding identification of both forms of vehicles. These data are utilized to compute alert conditions as well as to develop a real time map of the airport which may be provided at a tower installation for air traffic control utilization as well as at an aircraft flight deck during the course of ground maneuvering. Through the utilization of aircraft tail numbers as an index, a master host memory may be developed which includes flight numbers, aircraft characteristics and the like which may be employed for evolving alert conditions and the like.

23 Claims, 14 Drawing Sheets

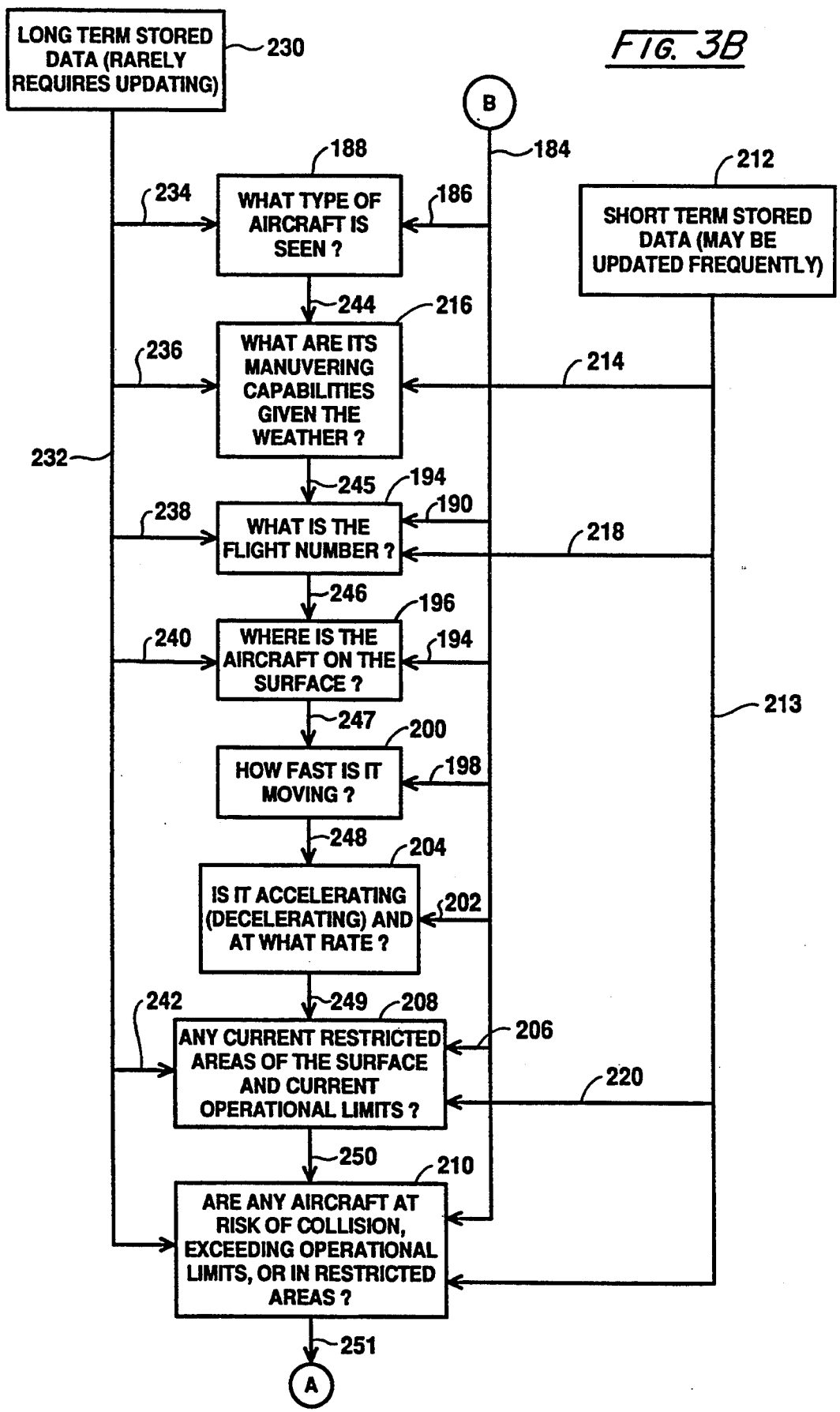

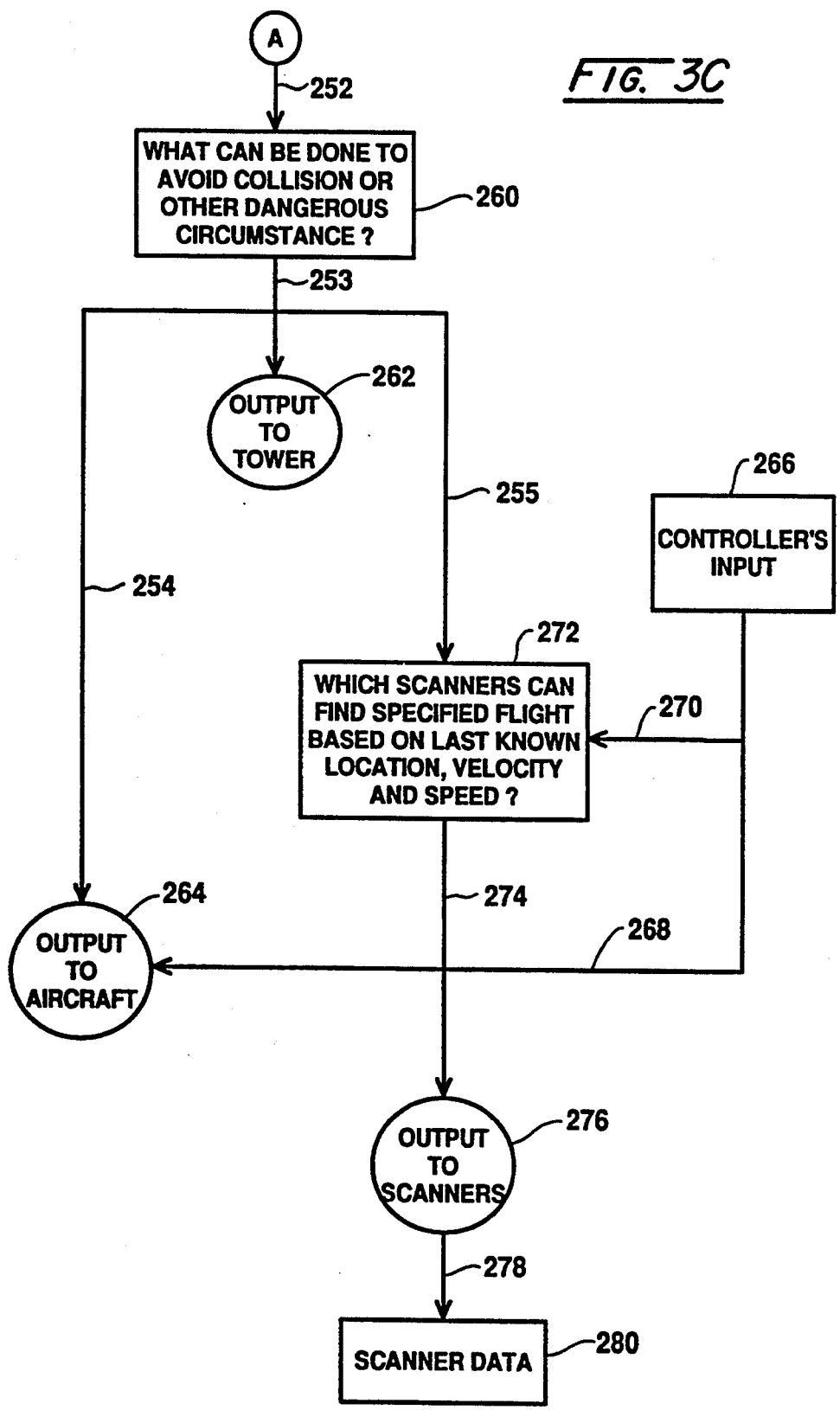

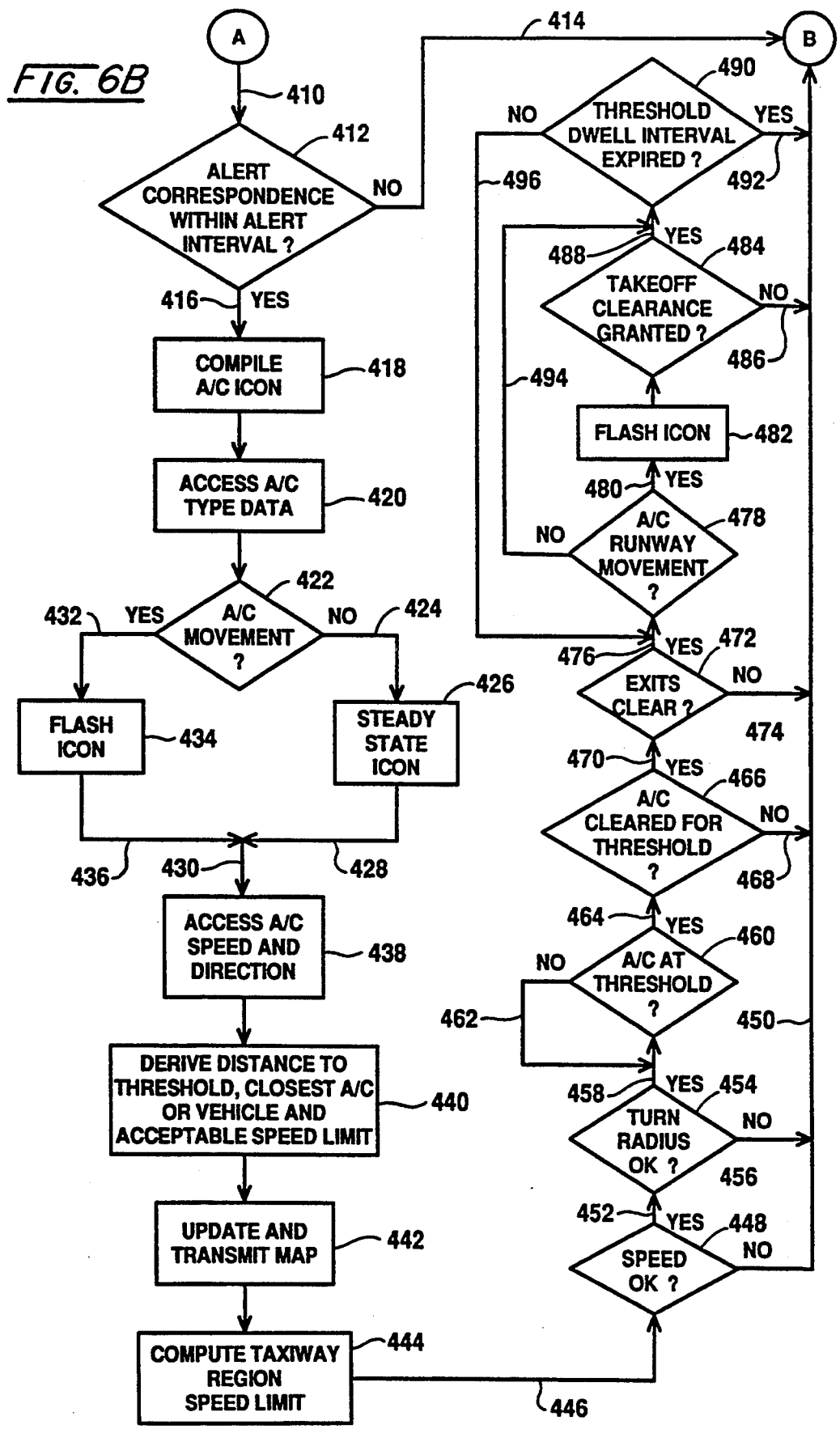

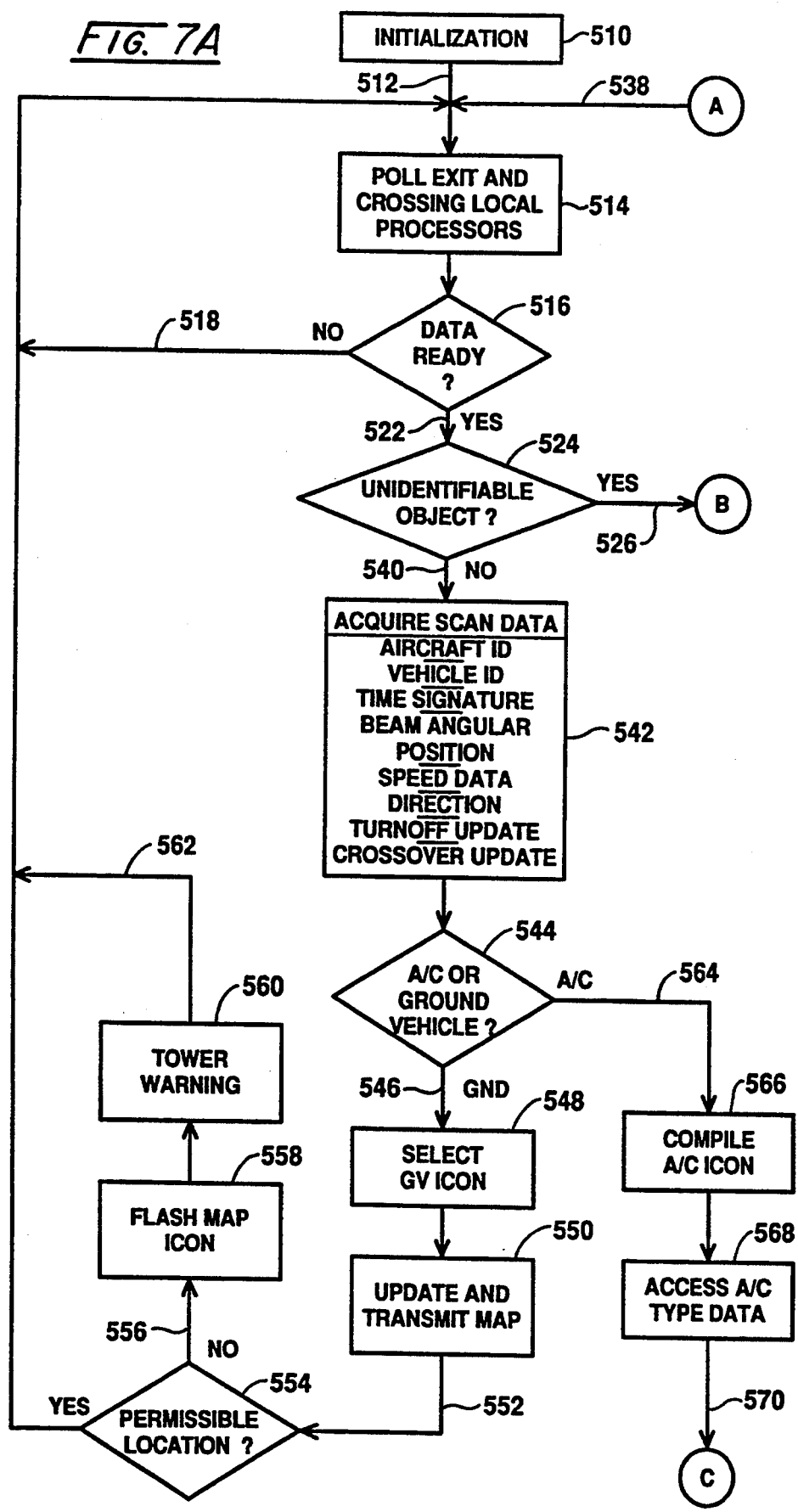

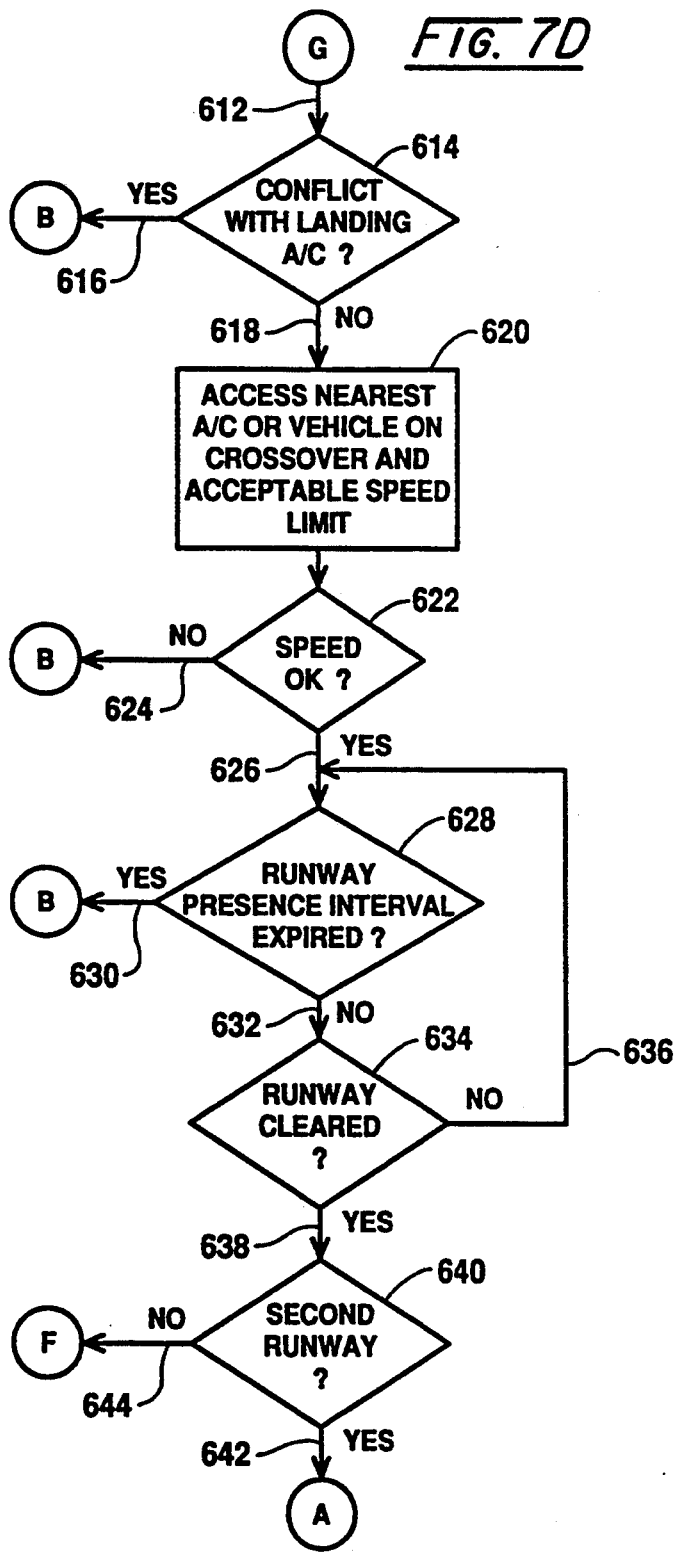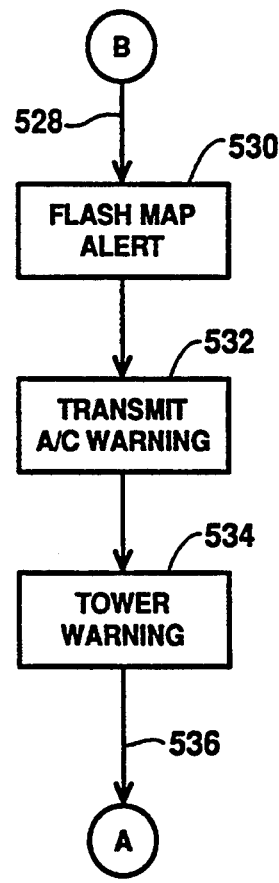

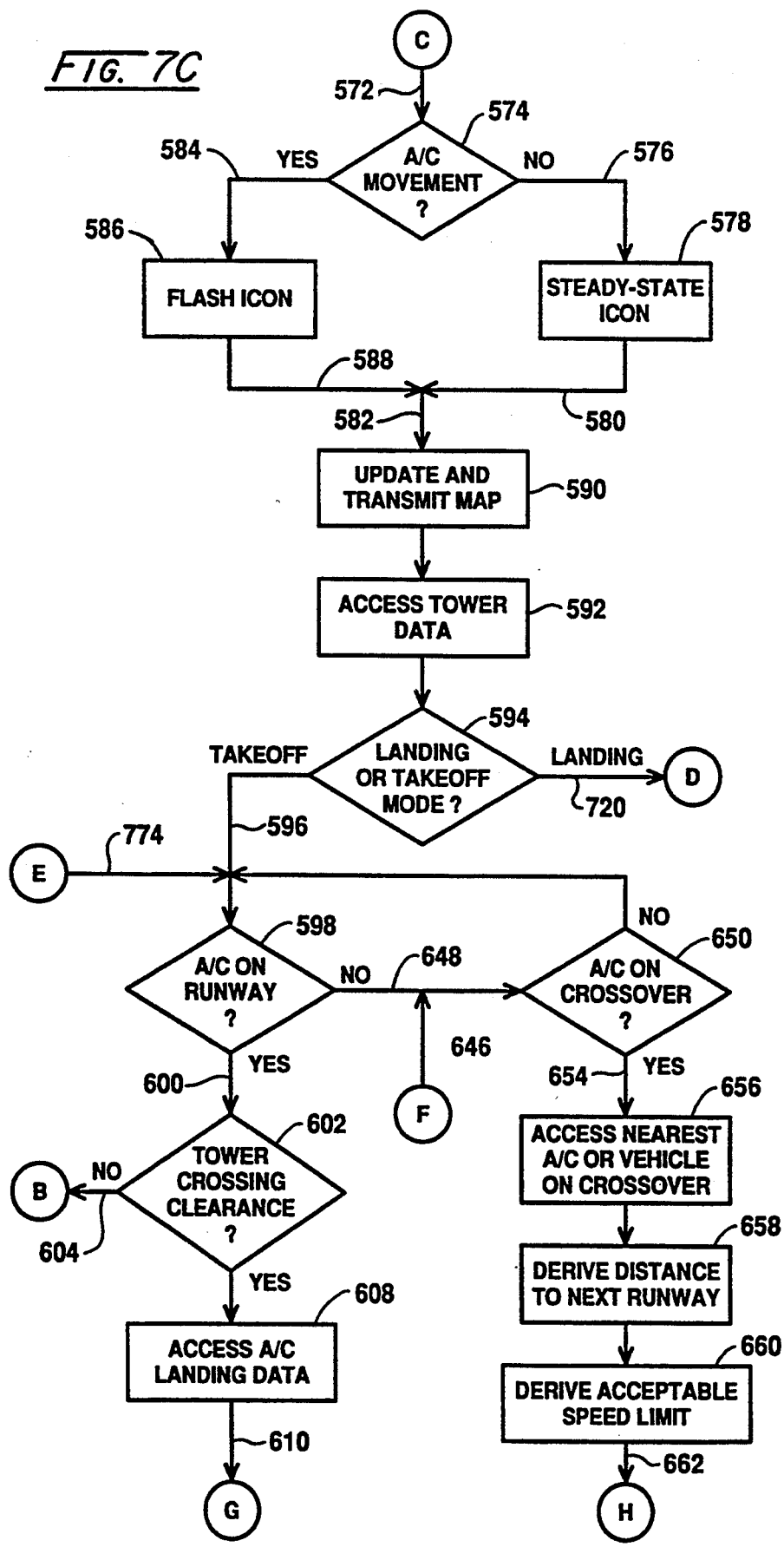

SURFACE DETECTION SYSTEM FOR AIRPORTS

BACKGROUND OF THE INVENTION

A continuous, worldwide expansion of the air transportation industry has been accompanied by the development of concomitant improvements in performance, range, and capacities of aircraft. In conjunction with this expansion, ground based support systems including radar and navigational facilities for in flight control and the like have been enhanced. Expansion in this industry also has generated substantially enlarged airport facilities with heightened levels of air traffic control. A typical airport facility will have multiple runways with feeding taxiways, runway turn-off lanes, cross-over taxiways extending between runways, and like ground movement support facilities. All such components of the airport complex function in conjunction with passenger and cargo terminals generally disposed over an extensive territorial region. Tower based air controllers thus not only are called upon to monitor and control local airborne traffic engaged in take-off and landing activities, but also to carry out control over what are becoming elaborate traffic patterns of aircraft and airport staff vehicles moving on the ground about the airport complex. A continuing occurrence of collisions between aircraft during ground maneuvering operations has demonstrated a need for a system for the efficient, reliable, and safe control and coordination of aircraft ground traffic. Currently, this coordination by tower based personnel can be drastically hampered by poor visibility, on-airport obstructions, or misidentification of on-airport vehicles.

Human vision of ground traffic by tower personnel currently represents the principal mode of ground movement control, however, this elementary, approach is supplemented by the corresponding but highly restricted vision of aircraft pilots, whose vision is essentially forwardly of typically large aircraft, which in a ground movement mode are quite cumbersome. The pilot also will have on board runway-taxiway maps as an aid, for example those distributed by Jeppsen Sanderson, Inc. (Jeppsen Maps). However, such information, while essential, is passive in nature. Where ground visibility is hindered, the pilot can identify aircraft location by radio communication. i.e. cockpit-generated position reports to the tower. That pilot awareness information may be wholly or partially inaccurate. For example, the tail region of larger aircraft may extend into a runway at a cross-over location even though the forward cabin is on the taxiway. Further, with the advent of "hub" inspired traffic, extensive cuing of aircraft now appears at runway thresholds at popular flight times. A misdescription of the aircraft sequence well may impose a human factor's demand upon the working memories of tower personnel which may be the occasion of human error.

Tower based visual perception may be supported through the use of radar, however, radar identification of ground traffic is subject to somewhat inherent constraints. That mode of identification is subject to attenuation by rain or similarly inclement conditions, unfortunately conditions where aircraft position information is most essential. Additionally, radar conventionally exhibits a lack of short range precision and is blocked by ground obstructions and the like. The radar identification approach also will not provide precise aircraft identification but only the presence or absence of a target at any given location without orientation information or the like.

SUMMARY

The present invention is addressed to a system and method for detecting and monitoring the position of aircraft in the course of their ground based maneavering about an airport facility. Aircraft and ground support vehicles are identified and their positions determined by scanner assemblages strategically positioned for monitoring runway thresholds and turn-offs, threshold accessing taxiways, as well as turn-off taxiways. Scanning is carded out through the utilization of unique, machine readable codes such as bar codes positioned on the aircraft and vehicles, and through the use of optical beam scanning devices, for example, using infrared base components. By employing bar codes which identify the aircraft tail number, an associated computer-based control system may access memory for an identification of the aircraft and its ground operational characteristics, as well as data corresponding to a map of the pertinent portions of the airport facility. Position and movement information then can be computed and displayed as an output to control tower personnel. Such computation also can be utilized to generate an alert at the display in the presence of an incipient condition for collision of two aircraft or an aircraft and a ground vehicle. Presence/absence detectors are included with the scanning system to locate and alert tower personnel as to the presence and location of non-coded or unidentifiable objects at critical taxiway or runway locations.

Inasmuch as the beam outputs of optical scanners can themselves be modulated. real time airport map displays showing the location of scanned aircraft and ground vehicles also may be provided at the flight decks of aircraft during their ground maneuvering.

Another aspect of the invention provides for the identification and position determination of aircraft in the course of landing. In particular, through the use of vertically oriented scanners in conjunction with machine readable codes such as bar codes positioned on an under surface of the aircraft, information as to aircraft identity, position, and altitude can readily be obtained for transmission to an airport facility tower. By integrating the information so obtained, the tower-based controller will have the opportunity to observe that an aircraft is indeed in a landing configuration, for example at flare-out, and is identified as the appropriate aircraft for that maneuver.

Another feature of the invention provides a surface detection system for monitoring the positions of pilot operated aircraft while moving on the surface of an airport facility having a control tower, two runways having thresholds and taxiways accessing the thresholds and crossing taxiways extending between the runways. A machine readable code is positioned upon and uniquely identifies the aircraft. A threshold scanner assemblage is provided which is positioned for scanning the threshold of each of the runways to derive first scan signals corresponding with the machine readable code and the location of a scanned aircraft. A taxiway scanner assemblage is positioned for scanning select locations of the taxiways to derive second scan signals corresponding with the machine readable code and location of a scanned aircraft. A transmission arrangement serves to convey the first and second scan signals and a display is positioned at the control tower which is responsive to input signals for displaying the location of the scanned aircraft. A memory is provided which retains accessible aircraft identifying data corresponding with each code and a control arrangement is responsive to the first and second scan signals for accessing the aircraft identifying data and generating the display input signals.

As another feature, the invention provides a method for monitoring the position of pilot operated aircraft while moving on the surface of an airport facility having a control tower, a runway with a threshold, and a turn-off location, and taxiway surfaces accessing the threshold and turn-off location, comprising the steps of:

providing a machine readable code at a predetermined location on and uniquely identifying the aircraft;

accessing the aircraft borne codes by carrying out the scanning of the airport surface at the threshold and turn-off location to derive scan signals corresponding with the machine readable code;

providing a memory for retaining aircraft identifying data corresponding with each code;

accessing the memory in response to the scan signals to identify the aircraft and its position on the airport surface; and providing a visually perceptible indication of the aircraft identity and position at the control tower.

Still another feature of the invention is the provision of a surface detection system for monitoring the position of pilot operated aircraft while moving on the surface of an airport facility having a control tower, a runway, a runway turn-off and a taxiway for accessing the runway and runway turn-off. The system includes a machine readable code which is positioned upon and uniquely identifies the aircraft. A runway turn-off scanner assemblage is provided which is positioned for scanning the runway at the turn-off to derive first scan signals corresponding with the machine readable code and the location of a scanned aircraft. A taxiway scanner assembly is provided which is positioned for scanning select locations of the taxiway to derive second scan signals corresponding with the machine readable code and the location of scanned aircraft. A transmission arrangement is included for conveying the first and second scan signals and a display is positioned at the control tower which is responsive to input signals for displaying the location of the scanned aircraft. A memory is provided for retaining accessible aircraft identifying data corresponding with each code and a control arrangement is provided which is responsive to the first and second scan signals for accessing the aircraft identifying data and generating the display input signals.

Another feature of the invention provides a detection system for monitoring the positions of pilot operated aircraft having a lower disposed surface while airborne over and adjacent to the approach portion of a runway during a landing procedure at an airport facility having a control tower. The system includes a machine readable code positioned upon the lower disposed surface of the aircraft which uniquely identifies it. A scanner assemblage is provided which is positioned adjacent the runway in the vicinity of the approach portion for scanning generally vertically over the runway to derive scan signals corresponding with the machine readable code and the location of a scanned aircraft over the runway. A transmission arrangement provides for conveying scan signals and a display at the control tower is responsive to input signals for displaying the location and identification of the scanned aircraft. A memory incorporated in a system which retains accessible aircraft identifying data corresponding with each of the machine readable codes and a control arrangement is responsive to the scan signals for accessing the aircraft identifying data and generating the display input signals.

For a fuller understanding of the nature and objects of the invention, reference should be had to the following detailed description taken in conjunction with the accompanying drawings.

Other objects of the invention will, in part, be obvious and will, in part, appear hereinafter.

The invention, accordingly, comprises the system and method possessing the construction, combination of elements, steps and arrangement of parts which are exemplified in the following detailed disclosure. For a fuller understanding of the nature and objects of the invention, reference should be had to the following detailed description taken in conjunction with the accompanying drawings.

BRIEF DESCRIPTION OF THE DRAWINGS

FIGS. 3A, 3B, and 3C combine as indicated by node designations to provide a block diagram of the information flow which may be carried out under the system of the invention;

FIG. 6A-6B combine as represented by node components thereon to provide a flow chart showing one aspect of a program performing in accordance with the system of the invention; and FIGS. 7A-7F combine as represented by node indications thereon to provide another program under which the system of the invention performs.

DETAILED DESCRIPTION OF THE INVENTION

Figure 1:
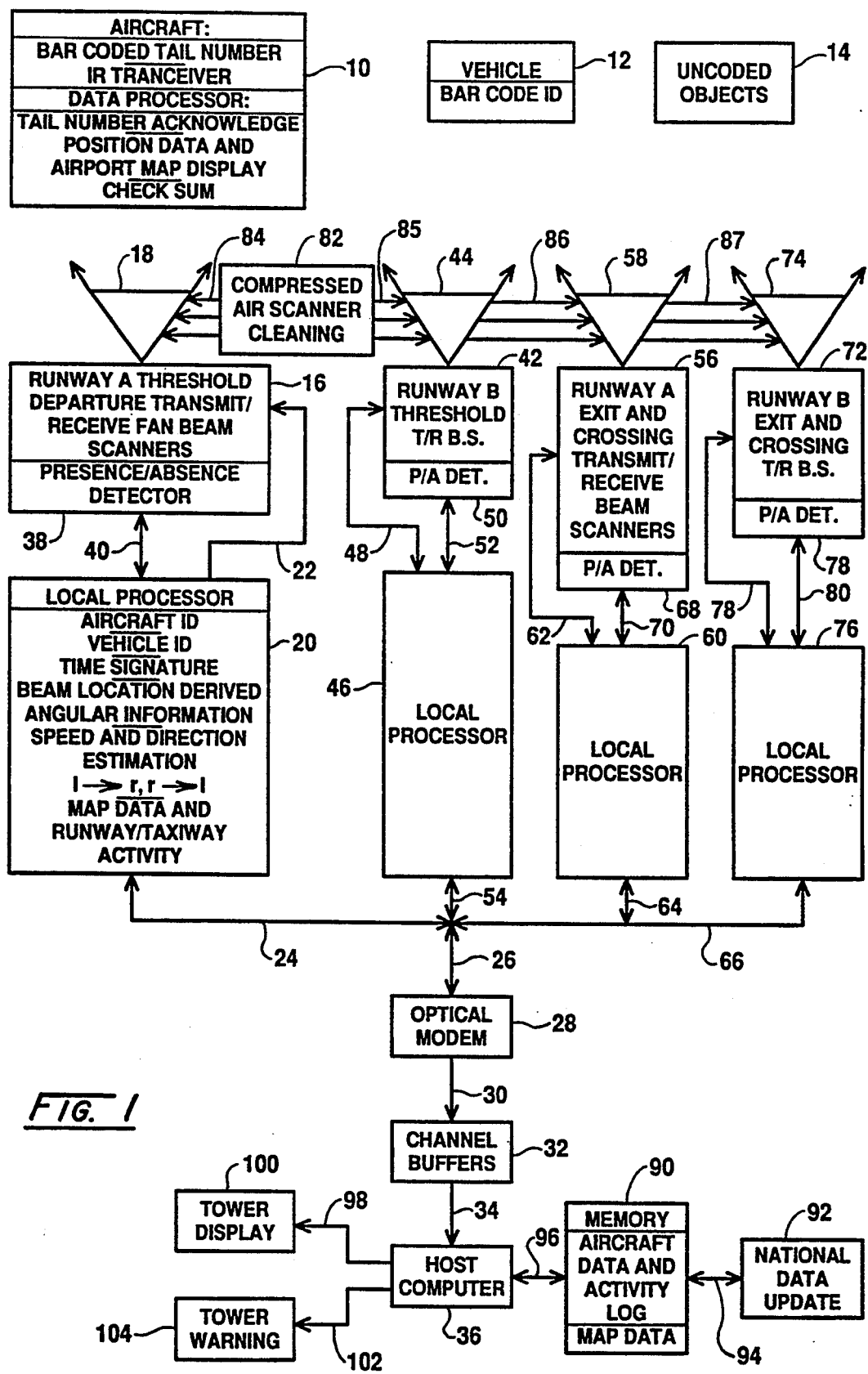
FIG. 1 is a block schematic diagram of an airport complex scanning system according to the invention.

Referring to FIG. 1, a block schematic representation of the system of the invention is revealed. In the figure, an aircraft is represented at block 10. Such an aircraft will have a unique, nationally designated tail number. For the purpose of the present system, this tail number will be provided at at least one and preferably two locations along the lengthwise extent of the aircraft in a machine readable bar code fashion. The positioning of the code is at a predetermined distance from the tail end of the aircraft, as well as a predetermined distance from the nose. By so predesignating those distances, the physical presence of any part of the aircraft with respect to its location on a runway and/or taxiway can be developed through computer analysis. Where vertical scanners are employed to locate the position at an aircraft in the course of landing wherein the aircraft is just above the approach portion of the runway, then the machine readable codes may be placed on an under surface. In this regard, the code can be positioned on the very bottom of the aircraft. Generally, the bar codes for taxiway and runway monitoring are located on a vertical or nearly vertical surface of the aircraft, for example on engine nacelles, wheel doors, or the fuselage below the wing or stabilizer to allow unobstructed scanning. Each code should include information describing where it, itself, is on the aircraft as well as the aircraft's registration or identification number. For example, the code may indicate a "left wing engine nacelle" or the like. Stored data then may provide information as to how far from the aircrafts nose the code is located. Additionally positioned with the aircraft at the location of one of the bar codes which, for example, may be located at the tail region of the aircraft, will be an infrared (IR) transceiver. A very small optical access is made through the skin of the aircraft for the purpose of developing IR communication with scanners at relatively close locations when the aircraft is in an active area of an airport complex. Also retained within the aircraft is a data processor which is employed for carrying out tail number acknowledgment procedures as are common in software communication. The on-board processor also may be employed to provide a real time visual output at a flight deck located CRT or the like showing an airport map display as communicated from the scanners through the IR port or transceiver which not only shows the location of that aircraft, but also of other aircraft and ground vehicles at the map. Finally, a check sum procedure may be provided as is common in data communication linkages to assure the accuracy of communicating dam.

Vehicles located in the runway environment which are valid, will include staff cars, refueling figs, snow plows, emergency vehicles, and the like. These vehicles also will carry a bar code identifying them and the vehicular subject matter is represented in FIG. 1 at block 12. It is entirely possible that unauthorized vehicles may be present in the active regions of the airport complex. Such vehicles or the like would not carry a bar code and, without more, would not be identifiable by a conventional code scanning system. Such uncoded objects are represented at block 14 in the figure.

To locate aircraft and ground vehicles, strategically positioned about the runway take-off thresholds and the taxiways wherein aircraft queuing would be encountered, are a sequence of beam scanners. Additionally positioned with these beam scanners are presence/absence detector devices employed for the purpose of detecting uncoded objects as represented at block 14. Also strategically placed within the airport complex are exit and crossing scanners which function to identify aircraft as they turn off from a landing procedure onto high speed taxiways, crossing taxiway or ramps leading to the airport terminal region. These devices will perform in both landing and take-off modes for the aircraft. As before, the beam scanners for this purpose will be accompanied by presence/absence detectors to locate uncoded objects as represented at block 14 as well as coded aircraft and vehicles as described respectively in conjunction with blocks 10 and 12.

Identified next adjacent blocks 10–14 are a representative sequence of such beam scanners and presence/absence detectors. Inasmuch as typical commercial airports will have parallel runways, a parallel runway designation of A or B is provided in the drawing. The runway A threshold departure transmit/receive beam scanners of the system are represented at block 16, the sector related or arcuate output of the scanners being represented by the symbol 18. These scanners, whether singly or in combination, perform and are under the control of one or more local processors physically situated in their vicinity and represented in the figure at block 20. A variety of processors may be employed for this function, for example those incorporating a model 486 microprocessor at 33 MHz as marketed by Intel Corp. The control and data flow association between the beam scanners 16 and local processors as at 20 is represented by dual arrow 22. general, the local processor will translate the bar code dam to evolve the identification of the aircraft (aircraft ID) or the identification of the ground vehicle located by the beam 18 of the beam scanners 16 (vehicle ID). For each "sighting" by the scanning system, a time signature of month, day, year, hour, minute, and seconds is identified. Next, beam location derived angular information is provided. In this regard, a synchronization is provided between instantaneous beam position and the bar code identification to angularly locate the position of the bar code and, thus, the aircraft with respect to a runway or taxiway. More than one scanner may be employed for this purpose. With the scan information, should the vehicle or aircraft be in motion, an accurate estimation of the instantaneous speed of the aircraft or vehicle is readily computed at the local processor. Next, the beam orientations encountered during the tracking of aircraft or vehicle movement will also provide left-to-fight or fight-to-left movement data. Additionally transmitted to the aircraft from the local processor by modulation of the beam scanner output are map data, for example for CRT display of a real time activity map at the flight deck showing runway/taxiway activity in terms of icons representing aircraft or vehicles.

The local processor 20 is in data transfer communication as represented by lines 24 and 26 with an optical modem 28. In this regard, preferably, the form of communication is by fiber optics. The output of the optical modem 28 is directed, as represented, by line 30 to channel buffers represented at block 32 which, in turn, communicate as represented by line 34 with a host computer facility 36. Generally, the computer facility 36 will be located at the terminal region.

Positioned adjacent the beam scanners as a 16 are presence/absence detectors as represented by block component 38. These detectors, for example, may be conventional photoelectric devices, ultra sound systems, or the like. The input and control relationship between the detectors 38 and local processors 20 is represented by the dual arrow Each of the runways will include runway threshold scanning systems and presence/absence detectors. In this regard, the corresponding beam scanners for the thresholds of parallel runway B are represented at block 42, which is seen having a symbolized beam output 44. The scanning function represented at block 42 is controlled from a local processor function represented at block 46, interactive communication being represented by the dual arrow 48. Additionally as before, a presence/absence detector function accompanies the threshold beam scanners as represented by block 50 and dual communications arrow 52. Communication from the local processor function represented at block 46 with the host computer 36 is represented at line 54, and as before, extends through line 26 to the optical modem function 28, in turn, coupling information with channel buffers 32 to the host computer 36.

The exit and crossing beam scanners for runway A are represented in the figure at block 56, their beam outputs being represented by the arcuate symbol 58. As before, interactive communication between these scanners and a local processor function represented at block 60 is depicted by dual arrow 62. Communication of data from the local processor function 60 to the host computer 36 is represented by line 64 extending to line 66, in turn, representing fiber optic transmission to optical modem 28. The data then progresses through the buffer function 32 to the host computer represented at block 36. A presence/absence detector function is associated with the runway A exit and crossing beam scanners 56 as represented at blocks 68. Block 68 is seen to be in interactive communication with the local processor function 60 as represented by dual arrow 70.

The runway B exit and crossing beam scanners are represented in the drawing at block 72, the beams for this function being represented at symbol 74. Interactive communication with a local processor represented at block 76 is depicted by dual arrow 78 and communication of the local processor function 76 with host computer 36 is represented by the earlier-described fiber optic linkage 66, optical modem 28, and channel buffers 32. As before, a presence/absence detector is associated with the beam scanners represented at block 72 and are shown in the drawing at block 78 in interactive communication with local processor function 76 as represented by dual arrow 80. Also seen in the upper region of FIG. 1 is a compressed air scanner cleaning function represented at block 82. Such conventional devices are utilized in the airport environment to provide a blown and air flow over the scanner optics to aid in maintaining a clear optical view of the scanned region. The cleaning function is represented by the arrow groupings 84–87. Looking to the lower portion of FIG. 1, it may be seen that the host computer performs in conjunction with memory represented at block 90. This memory 90 retains aircraft data associated with each of the nationally assigned tail numbers. For example, the data will include information as to the dimensions of an aircraft, including dimensions from the bar code to the tail and bar code to the nose of the aircraft. Turning radius is included as well as wing span and safe taxi operational speed ranges. Additionally, the memory will retain multi-airport map data including updates as to construction sites, configuration alterations, and the like. The aircraft data and activity log is updated from national data sources as represented at block 92, the interactive information between the memory and that national data update being represented at dual arrow 94. Similarly, the association of memory function 90 with the host computer function 36 is represented by dual arrow 96. An association of the host computer with the tower in terms of a display of the map and updated aircraft activity on that map is represented by line 98 and block 100, while the tower warning function of the host computer is represented by line 102 and block 104. A utilization of a plurality of local processors has the particular advantage of monitoring substantial scanner activity even if one scanner/processor ceases to function. Not shown in FIG. 1 are the vertical scanners located at the approach regions of a given runway. These scanners function for the specific purpose of identifying an aircraft in the course of landing when it is at a relatively low altitude. The aircraft identification information so derived is employed, following memory access, triangulation and the like for the purpose of apprising the controller at tile tower facility that an aircraft which has been cleared for landing is indeed about to land. This same landing data may then be used in conjunction with the runway, turn-off and taxiway scanning system.

Figure 2:
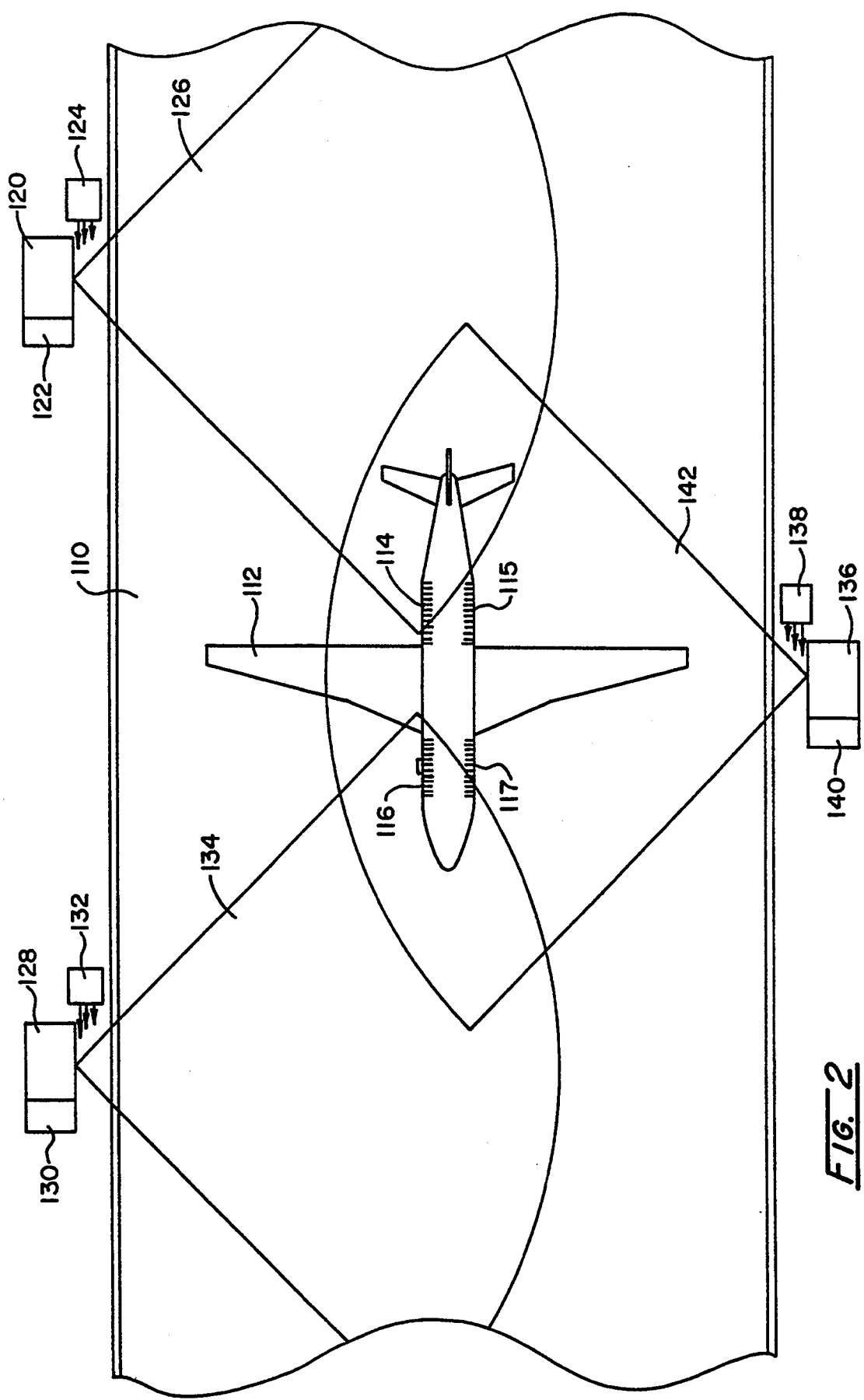
FIG. 2 is a partial, schematic view of an aircraft on a runway showing in highly exaggerated form, the interaction of bar codes positioned on the aircraft with respect to scanning installations.

Referring to FIG. 2, a schematic representation of scanner and presence/absence detectors adjacent an airport taxiway is represented. In the figure, the runway 110 is seen supporting an aircraft schematically represented at 112. The aircraft 112 carries bar codes which are represented in the figure in grossly exaggerated scale in the interest or clarity. These bar codes are seen, for example, on each side of the aircraft at 114 and 115 and are associated with the rearward or tail region of the aircraft. In similar fashion, bar codes 116 and 117 are represented in greatly exaggerated fashion at the forward or flight deck region of the aircraft 112. Embedded within the bar codes may be small optical transceivers which may respond to modulated IR beams from the scanning region through which the aircraft 112 passes in the course of taxiing. In this regard, a scanner is represented at 120 adjacent the runway 110 in conjunction with the presence/absence detector 122 and a compressed air scanner cleaning assemblage represented at 124. Scanner 120 provides a beam scan represented at 126 which is seen intercepting bar code 114 formed on aircraft 112. In similar fashion, a next adjacent scanner is seen at 128 in conjunction with a presence/absence detector 130, and compressed air cleaning function 132 Scanner 128 projects a scanning beam represented at 134 which is seen to read bar code 116 as well as provide local communication with the aircraft 112 through modulation of the IR beam 134. Oppositely disposed and adjacent to runway 110 is a third scanner 136 which performs in conjunction with compressed air scanner cleaning apparatus 138 and a presence/absence detector 140. The beam output of the scanner function 136 is represented at 142 accessing both bar codes 115 and 117 on the aircraft 112. As is apparent, the location of aircraft 112 on the taxiway 110 is readily discerned by triangulation from the known positions of at least two of the scanners 120, 128, or 136, and the angles at which they detect the bar codes. Additionally, because of the scanning beam approach of the surface detection system, the velocity of the aircraft 112 during its taxiing maneuver is readily computable in view of the multitude of scans and relatively slow movement of vehicles on taxiways as at 110. Further, should the aircraft 112 be turning off from a runway or the like, the extent of its clearing the runway, for example, determination as to whether its tail region protrudes into the runway is readily discerned by the local processors performing in conjunction with a host computer. Not shown in FIG. 2 are machine readable bar codes which would be positioned on a lower disposed surface of the aircraft 112. These codes would be used in the earlier-noted vertical scanning system employed for the purpose of identifying airborne aircraft in the course of landing.

Figure 3A:
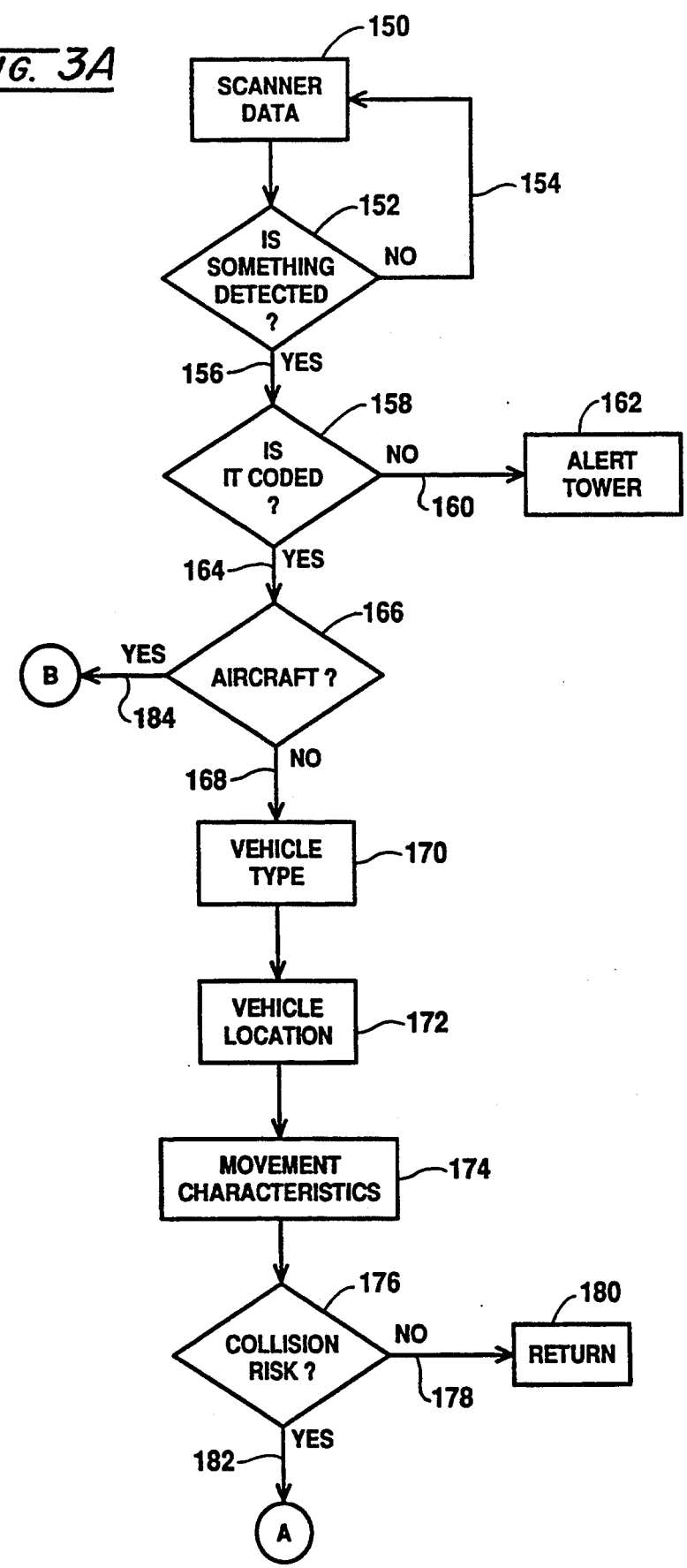

FIGS. 3A–3C combine to form an information or data flow diagram illustrating the interrelationship of scanned data, both passive and active, ultimately resulting in information communication to the cockpit of the aircraft on a taxiway and further functioning to provide information to control personnel typically located in the tower of an airport complex.

Looking to FIG. 3A, scanner derived data is represented at block 150. These data will derive from those scanners which are actively detecting aircraft and, presumably, communicating map data to them. Data will include aircraft tail number, binary bar code information, where the bar code is located on the aircraft, and what the scan angle for the aircraft is, such that appropriate location and speed information can be generated at the local processor. The presence/absence function also is evolved in connection with these data. For example, as represented at block 152, either a bar code will be detected or the presence/absence device will detect the presence of some object essentially within the scan region. Until some information is available, the system will loop as represented by loop line 154. Where some detection is at hand, then as represented by line 156 and block 158, a determination is made as to whether the object is coded. If it is so coded, then an input will be available from the scanner. Otherwise, the only detecting input will be available from the presence/absence detector. Where no coding is present, then as represented at line 160 and block 162, the tower is alerted that some object which cannot be identified is present in the vicinity of that particular scanner and presence/absence detector unit. More than likely, the best information development at that juncture is by human eyesight from the tower, where available. Where a coding is present on the detected object, then as represented at line 164 and block 166, a determination is made as to whether the coded vehicle is an aircraft or non-flying vehicle. In the event that it is in the latter category, then as represented at line 168 and block 170, a determination is made as to what type vehicle is at hand. Additionally, as represented at block 172, vehicle location is determined and as shown at block 174, its movement characteristics are determined. In this regard, information as to excessive speed and the like is derived. A determination then is made as to whether a collision risk is present as represented at block 176. In the event that such a condition does not exist, then as represented at line 178 and block 180, a return is made to continue data flow as represented at block 150. Where collision risk is present, then the data flow continues as represented at line 182 and node A.

Returning to block 166, where a determination is made that an aircraft has been located and is coded, then as represented at line 184 and node B, a broad range of conditions are evaluated. Looking to FIG. 3B, node B reoccurs with line 184, and as represented at branch line 186 and block 188 the scanner data aids in determining what type of aircraft is seen. For a commercial aircraft, a corresponding flight number may be derived as represented at branch line 190 and block 192. Aircraft position is evolved from scanner data as represented at branch line 194 leading to block 196. The location of the aircraft above the surface of the runway for vertical scanner system operation also will represent the information evolved in conjunction with block 196. This same form of data may be employed to compute the speed of movement of the aircraft as represented by branch line 198 and block 200. That same data then may be treated to determine acceleration or deceleration aspects of the taxiing aircraft as represented by branch line 202 and block 204. Operational limits or restrictions may be compared with the scan data as represented by branch line 206 and block 208 and risk of collision conditions, unsafe speeds, or other restricted area conditions may be evaluated as represented by line 184 and block 210.

Block 212 depicts the presence of what may be termed as "short term" stored data which is of a variety which is updated frequently. Such data will include flight numbers assigned from the airport complex and correlated with aircraft tail number, weather conditions, the status of runways, taxiways, cross overs and the like. These short term data are shown associated with earlier-described blocks via line 213. In this regard, branch line 214 is seen associated with block 216 wherein a determination can be evolved comparing the maneuvering capabilities of the aircraft with given weather conditions. Branch line 218 may provide a flight number update for a given tail number and branch line 220 is seen contributing data with respect to restricted regions of the airport complex, operational limits and the like. As is apparent, these short term data also contribute to determinations made as to risk of collisions, excessive speed or operational limits, and the presence or absence of restricted regions as represented at earlier-described block 210.

Information or data flow also will be of a long term stored variety. These data, as represented at block 230, will rarely require updating and includes the layout of the airport complex along with the location of scanners on it. The data compilation will include the registration numbers of all aircraft and the types of aircraft along with maneuvering data, weight characteristics, and the like. As represented at line 232 and branch 234 the data will contribute to a determination as to what type of aircraft is seen, as represents, at block 188; a determination of the maneuvering capabilities of that aircraft given weather conditions, as represented at branch 236 and block 216; a determination as to what the flight number is which corresponds to the tail number, as represented by branch 238 and block 192; a determination as to where the aircraft is located, as represented at branch 240 and block 196; a determination as to operational limits or other restrictions, as represented at block 208 and branch 242, and as represented by line 232 and block 210, risk of collision information is evolved as well as speed and operational restrictions.

Blocks 188, 216, 192, 196, 200, 204, 208, and 210 represent answers evolved out of the algorithms of control software and the informational flow then may be depicted by the arrow sequence 244–251 leading to node A. Returning to FIG. 3C, node A again reappears in conjunction with line 252 looking to a conclusionary block 260 representing the compilation of answers to the query as to what can be done to avoid collision or other dangerous circumstances. This compiled answer then is outputted to the tower as represented by sequence line 253 and node 262. Information delivered to the tower thus may include the surface layout of the airport complex along with icon illustrated or alphanumeric identifications of aircraft with flight number and computed position on the airport complex surface. Additionally, identification and location of ground-based vehicles will be presented. Velocity or speed and direction information can be supplied as well as acceleration or deceleration based emergency data. Map information will include an identification of restricted areas and alerts as to operational limits of aircraft can be supplied. Additionally, alert information calling a controller's attention to a collision risk or operational limit excess can be supplied as well as the unlawful presence of aircraft or vehicles within a restricted area. The form of output in the alarm sense can be audibly as well as visibly perceptible and, finally, recommendations as to controller action can be supplied from software. Information not only can be transmitted to the tower as represented at node 262, but also important information can be transmitted as represented by line 254 and node 264 to aircraft in the course of their ground maneuvers. Thus, the pilot, when on the ground, will have information displayed as to the layout of the airport complex; the presence of alert conditions, the location of them; and the relative positioning of the aircraft at hand with respect to other aircraft and ground based vehicles. The tower based controller also may have input to the system as represented at block 266. In this regard, the controller will have an input by radio communication with tile aircraft as represented at line 268. Further, as represented at line branch 270 and block 272, inquiries can be made to specific scanner installations to locate aircraft. This type of request also can result from collision avoidance conditions or the like as represented by line 255 extending from line 253 and block 260. Accordingly, inquiries as represented at block 272 can be directed to the local processors of scanning installations as represented at line 274 and node 276. The latter output from node 276, can develop additional scanner data as represented at line 278 and block 280.

It may be observed that the vehicular inquiry described in conjunction with FIG. 3A and extending from line 182 to node A also will continue to follow the same informational flow as represented in FIG. 3C commencing with node A and line 252.

Figure 4:
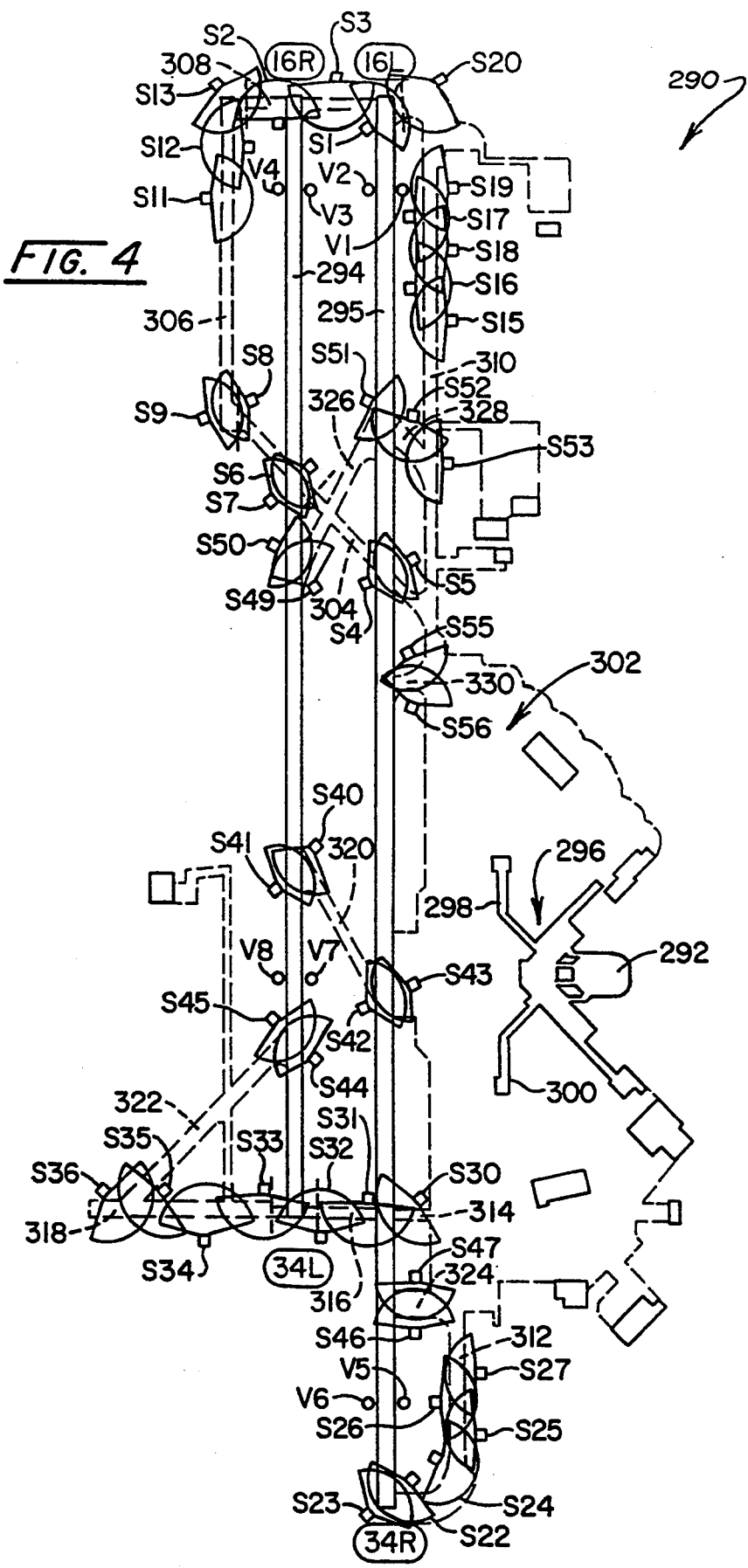
FIG. 4 is a map of an airport installation showing the location of scanning and presence/absence components according to the system of the invention.

The positioning of beam scanners and presence/absence devices in accordance with the system of the invention is readily described in connection with an airport facility map. An airport complex is illustrated in map-like form in FIG. 4 as representative of, for example, a facility located in the western United States. FIG. 4 is drawn in similar fashion as the outlines which may be incorporated as an earlier-noted "Jeppsen Map". In the figure, the airport complex, represented generally at 290 includes a tower at 292, controller personnel within which may visually observe two parallel runways 294 and 295 which are approached by aircraft from one end by the respective compass headings 16R and 16L and from the opposite end by compass headings 34L and 34R. Such labeling is positioned upon the drawing for convenience. Aircraft will be in a passenger egress and ingress operational mode in connection with a terminal 296 having aircraft accessing piers 298 and 300 positioned about a somewhat expansive tarmac 302. Depicted schematically about the taxiways, cross-overs, thresholds and the like of the airport complex 290 are beam scanner locations showing beam regions of influence. Additionally considered to be positioned with these locations are the noted presence/absence detectors. Looking initially to runway designations 16R and 16L, note that beam scanners S1, S2 and S3 monitor the actual thresholds of the runway, as well as a cross-over taxiway extending between the thresholds of runways 16R and 16L.

With this arrangement, two scanners will be capable of scanning a single aircraft to permit position triangulation. Accordingly, the scanning beam ranges and angular extent overlap enough to assure that at least two scanners will see the aircraft or vehicle under surveillance at any given time. This permits the noted triangulation and accurate position detection. Runway 164 is accessed for departure purposes from a crossing taxiway 304 which extends from the tarmac 302 to a taxiway 306 extending, in turn, to taxiway 308 extending to the threshold of runway 16R. The threshold of runway 16L can be accessed for departure from taxiway 310 as well as from the crossing taxiway 308. To monitor the movement of aircraft from tarmac 302 to the threshold of runway 16R, scanners S4–S7 monitor the runway crossings adjacent cross-over taxiway 304. As aircraft then approach taxiway 306, scanners S8 and S9 are employed. Additionally, as aircraft may queue towards the threshold of runway 16R, scanners S11–S13 are provided to continuously monitor the sequence of aircraft within any taxiway queuing thereof. Finally, the presence of the aircraft upon the critical threshold of runway 16R is monitored by scanners S2 and S3. Should aircraft cross between the thresholds of runway 16R and 16L, scanner S3 will monitor such activity.

Considering the threshold of runway 16L, it may be observed that aircraft on the taxiway 310 are monitored by a sequence of scanners S15–S20. At the critical threshold position of runway 16L, scanners S1 and S20 will identify the presence and movement of aircraft. As before, the queuing sequence of aircraft may be monitored for tower based controller confirmation by scanners S15–S20.

Now considering the departures from the opposite end of runways 294 and 295, scanners S22 and S27 function to monitor the threshold of runway 34R, while complementing scanners S24 and S27 monitor a taxiway 312 extending thereto from the tarmac 302. In similar fashion, cross-over taxiways 314 and 316 access the threshold of runway 34L and are monitored by scanners S30 and S33. If, for any reason, access to the threshold of runway 34L is made from taxiway 318, then scanners S33–S36 may be employed for location tracking.

Now considering arrivals or the landing of aircraft, aircraft, for example, will approach runway 16R, whereupon, following adequate deceleration, will exit, for example, from a high speed taxiway as at 320. At this position, their clearance of runway 294 is monitored by scanners S40 and S41, while their exiting from taxiway 316 to crossover runway 295 and entry to tarmac 302 is monitored by scanners S42 and S43. The next high speed taxiway electable by the pilot is seen located at 322, the exit from runway status of any aircraft being monitored by scanners S44 and S45. The aircraft then is monitored as it progresses toward the tarmac 302 via taxiways 322, 318, 316, and 314 by the earlier-described scanners S30–S36.

Aircraft arriving or landing upon runway 16L may exit directly to the tarmac and are monitored thereat by scanners S42 and S43. Similarly, for landings of longer duration, for example, turning off at taxiway 314, monitoring will be carried out by scanners S30–S32. For exiting at taxiway 324, monitoring by scanners S46 and S47 is carried out.

Approaches to runway 34L by aircraft will involve an exit at high speed taxiway 326 as monitored by scanners S49 and S50. The resultant cross-over at exit taxiway 328 is monitored by the latter scanners, S51–S53, as aircraft enter taxiway 328. Reverse flow aircraft traffic at taxiway 310 then is monitored, for example, by scanner S53. Aircraft missing the high speed turn-off or taxiway 326, must either progress to taxiway 306 arid are monitored at scanner S6 or progress to the end of the runway at the threshold thereof to be monitored by scanners associated with threshold taxiway 308.

Aircraft approaching runway 34R generally will exit at turn-off taxiway 330 as monitored by scanner S55 or, conventionally, will progress to taxiway 328 as monitored from scanners S51 and S53. Finally, the aircraft may proceed to the end of the runway wherein they are monitored by scanners S1 and the sequence of scanners S15–S20 as well as scanners S51–S53.

The positioning of runway vertical scanners is shown in FIG. 4 utilizing a circular symbol. In this regard, the approach region for runway 16L is seen to be scanned by vertical scanners V1 and V2. The corresponding approach region for runway 16R is shown at scanners V3 and V4. These scanners V1–V4 are positioned a distance from the runway threshold selected such that the aircraft being interrogated or scanned will be at a height appropriate for laser based scanning systems. Generally, these scanning systems will perform at ranges, for example, of up to 200 feet. Thus, aircraft within that range can be identified and the information then communicated to the controller at the airport facility tower. Of course, it is desirable that the information so developed, particularly identifying the aircraft, for example, by flight number, be integrated with the information normally coming to the controller in controlling flight arrivals through radar systems.

In similar fashion, runway 34R is monitored by vertical scanners V5 and V6, while runway 34L is monitored by vertical scanners V7 and V8.

Figure 5:
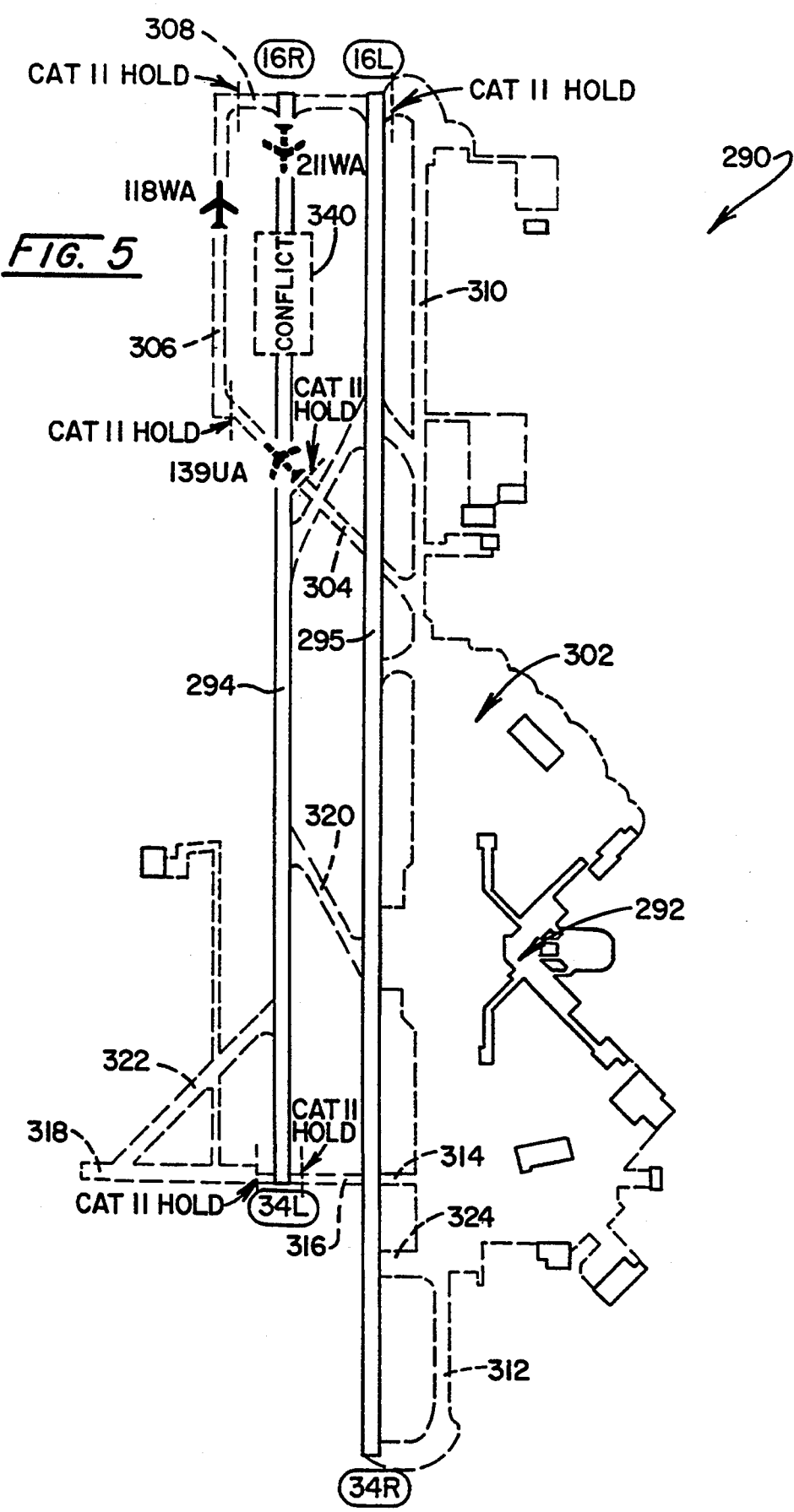
FIG. 5 is a drawing of a map which may be produced in real time within a tower environment as well as aircraft environment in accordance with the system of the invention.

Turning to FIG. 5, the airport complex map 290 is reproduced as it would appear at a tower display, for example on a cathode ray tube (CRT) based system, plasma or LCD based digital output devices. This same map, according to the system of the invention, also may be presented at the flight deck of ground maneuvering aircraft. The map not only shows the airport complex 290 updated with respect to construction revisions and the like, but also affords controller personnel as well as pilots a real time visual interpretation of ground movement patterns. In the figure, the tower and the pilot of an aircraft identified on the display as Flight 211, Western Airlines (211WA) may perceive that a conflict exists with another aircraft shown by an icon with the identification for Flight 139, United Airlines (139UA) at runway 294. A potential conflict is visually perceptibly indicated by a flashing rectangular alert 340 which may be accompanied by an audible alert at all readout locations. The pilot of Flight 139, United Airlines, knows that his aircraft is in a conflicting situation with an aircraft taking off from the threshold of runway 16R which is Flight 211, Western Airlines. Conversely, the pilot of the latter flight is aware that continued acceleration in a take-off mode represents a questionable activity. Either the tower controller or the pilot of Flight 211, Western Airlines, may call for an abort at this point in time. Thus, the real time aspect of the display becomes valuable. By scanner triangulation of the presence of even a portion of the aircraft represented as Flight 139UA on the runway, the conflict 340 may be published. In the latter regard, movement and direction of movement of vehicles may be represented by a flashing icon having a discontinuous form feature as represented by the designations of 211WA and 139UA in FIG. 5. A non-flashing icon, on the other hand, as shown at Flight 118 of Western Airlines (118WA) shows that that aircraft is stationary. Taxiway positioned aircraft may be shown in blue, while aircraft on a runway as at 211WA may be shown as yellow, and the conflict area 340 or any other warming conditions may be published in a red color.

Figure 6A:
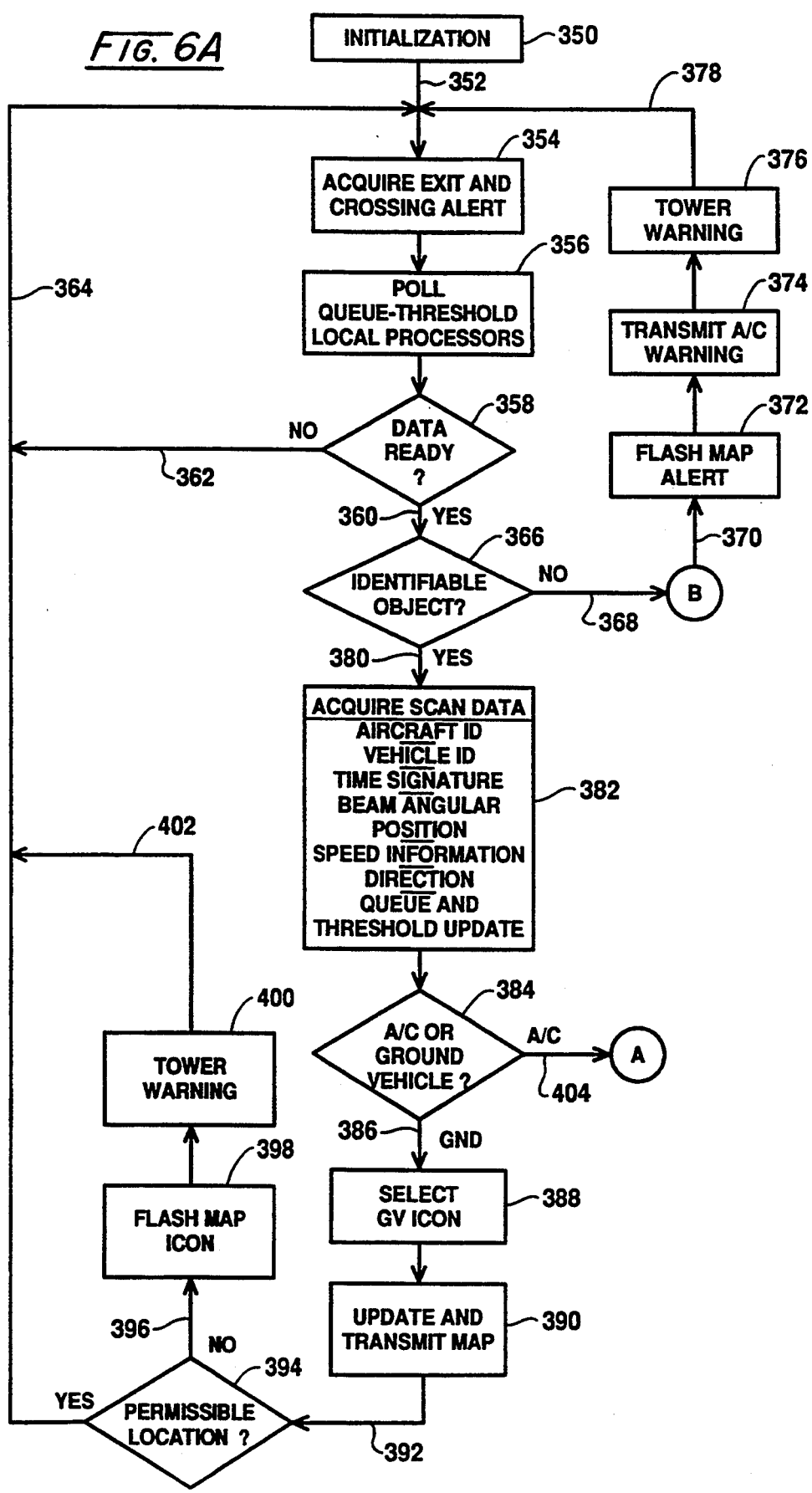

Referring to FIG. 6A, a generalized flow chart showing the interaction of local processors 20 and 46 and host computer 36 is portrayed. In general, the procedure represented in the flow chart is one concerning departure and thus looks to runway threshold conditions, cross-over information, and queuing of aircraft in preparation for take-off. The program commences with an initialization step as represented at block 350 and proceeds as represented at line 352 to acquire exit and crossing alert data as represented at block 354. These alert data will have been developed on earlier cycles of the program and herein are given a priority in updating. The program then proceeds to the procedures represented at block 356 wherein the pertinent local processors at the thresholds and taxiway queuing locations are polled. For example, these local processors will be as described in FIG. 1 at 20 and 46. Where that local processing function has compiled data and such data are ready, a resultant affirmative response will be received from the inquiry at block 358 as represented at line 360. In the event that the data are not ready, then as represented at lines 362 and 364 extending to line 352, the system awaits the presence of such data. Line 360 is seen to be directed to the inquiry at block 366 providing for a determination as to whether an identifiable object is present. This block, in effect, determines that an indication has been received from the presence/absence detector as represented at blocks 38 or 50 that an object is present and no corresponding bar code has been read from respective scanners 16 or 42. In the event that such object is not identified, then as represented at line 368 and node B, a warning condition is at hand. Looking momentarily to node B on the same figure, it may be observed that node B extends via line 370 to block 372 providing for the flashing of a map alert. Additionally, as represented at block 374, an aircraft warning may be transmitted to provide an alert condition for all pilots in ground maneuvering aircraft and, a warming similarly is provided to tower personnel as represented at block 376. The program then loops to line 352 as represented at line 378. Returning to block 366, where an identifiable object is present, then as represented at line 380 and block 382, scan data from the local processors are acquired. This information will include aircraft identification or vehicle identification where a ground vehicle has been located which is valid. A time signature representing month, day, year, hour, minute, and second is collected, and the beam angular position of the vehicle at hand is identified. Speed information may be gleaned from a single scanner in view of the rapidity of scan and relative slowness of vehicles. Additionally, the direction of movement, if any, is determined, i.e. direction will be from left to fight or fight to left with respect to the scanner at hand. Finally, queue location and the presence or absence of the aircraft at the threshold are determined and updated. The program then continues as represented at block 384. A determination is made as to whether an aircraft or ground vehicle is present. This information is developed from the bar code positioned upon the vehicle. Where a ground vehicle such as a staff car, maintenance truck or emergency vehicle is present, then as represented at line 386 and block 388, an icon representing a ground vehicle is selected. Then, as represented at block 390, using that selected icon, the airport complex map as represented in FIG. 5 is updated and, as represented at lines 392 and 394, the host computer is accessed to determine whether the ground vehicle is in a permissible location. In the event that it is, then as represented at line 364, the program loops. Where a negative indication is present with respect to the inquiry at block 394, then as represented at line 396 and block 398, the vehicle designated icon on the transmitted map is flashed. Additionally, as represented at block 400, a warning may be transmitted to the tower above and beyond the flashing map, for example, an audibly perceptible indicator. The program then continues as represented at line 402 to line 364 and line 352 to loop. Where the inquiry represented at block 384 determines that an aircraft has been identified, then the program progresses as represented at line 404 and node A.

Turning to FIG. 6B, node A reappears in conjunction with line 410 leading to the inquiry represented at block 412. This inquiry determines whether a condition such as an aircraft crossing a runway from or to a cross-over taxiway has been present on the runway for a period of time in excess of an acceptable predetermined interval. For such a combination of conditions, the system will automatically alert the tower and all aircraft by a map publication to the aircraft and the tower, as well as by an audibly perceptible alert at tower. While no dangerous conditions may be in existence for this alert condition, by bringing a potentially serious condition to the attention of all aircraft and the tower, a safer ground control system is evoked. Where the condition is one exceeding a predetermined alert interval, then as represented at line 414 and node B, the program reverts to line 370 at FIG. 6A to carry out "node B" warning procedures. Where the determination at block 412 is in the affirmative and no alert condition is at hand, then as represented at line 416 and block 418 the appropriate aircraft icon is compiled and, as represented at block 420, memory contained aircraft data are accessed. It may be recalled that such information may, for example, be retained in host memory 90. The program then proceeds to the inquiry, at block 522 for a determination as to whether the aircraft is in motion. In the event that it is not, then as represented at line 424 and block 426, a steady state icon is employed as described in conjunction with FIG. 5. The program then proceeds as represented at lines 428 and 430. Where movement of the aircraft under surveillance is indicated, then as represented at line 432 and block 434, the icon representing an aircraft is flashed and the program continues as represented at line 438. At this position, the host computer accesses the determined aircraft speed and direction and, as represented at block 440, the distance to the next closest threshold, aircraft, or vehicle is computed at the host computer anti a determination is made as to whether the aircraft is proceeding at an acceptable speed limit for the closing distance involved. The program then continues as represented at block 442 to update and transmit map data to all ground maneuvering aircraft and the tower. As represented at block 444 at which position, the taxiway region acceptable speed limit is computed with respect to weather conditions and the like. The program then proceeds as represented at line 446 to the inquiry at block 448 determining whether the speed is acceptable. Where it is not, then as represented at line 450 and node B, alerts and warnings are transmitted as represented by the sequence of events commencing with line 370 fiend FIG. 6A, carries out a "node B alert".

The program then proceeds as represented at line 452 to the inquiry at block 454. Here, accessed aircraft data with respect to available turn radius are compared with maximum turn radius for the maneuver about to be undertaken by the aircraft. Where the comparison shows an inadequate aircraft capability, then as represented lines 456 and 450, a node B alert ensues. Where the radii comparisons are deemed to result in an acceptable determination, then as represented at line 458 and block 460, a determination is made as whether this moving aircraft has reached a threshold of a runway in preparation for takeoff. In the event that it has not, then the program carries out a minor loop awaiting the presence of the aircraft at the threshold. This loop is represented at line 462. As the aircraft reaches the threshold of the runway, then as represented at line 464 and block 466, a determination is made as to whether the controller at the tower has cleared the aircraft for movement to the threshold. In the event that the tower has not, then as represented at line 468, a node B alert ensues.

Where the aircraft has been cleared as determined in connection with block 466, then as represented at line 470 and block 472, a determination is made as to whether the exits utilized by landing aircraft or aircraft crossing the runway at hand are clear. Where they are not, then a node B alert is generated as represented at line 474. Where the exits are determined to be clear, then as represented at line 476 and block 478 a determination is made as to whether the aircraft has commenced movement on the runway from its threshold position. Where that movement has been detected, then as represented by line 480 and block 482, the pertinent aircraft icon on the real time map is flashed to show movement. The program then continues to the inquiry at block 484 determining whether or not take-off clearance has been granted by the controller at the tower location. Where it has not, then as represented at line 486, a node B alert condition and procedure ensues. Where take-off clearance has been granted, then as represented at line 488 the program proceeds to the inquiry at block 490. This inquiry determines whether or not a pre-elected maximum interval for an aircraft presence at a threshold has expired. This component of the procedure and system is one wherein a predetermined interval is elected for the presence of an aircraft in a departure mode at a threshold which is considered to be a maximum, exceeding that maximum being generally considered a condition prompting an alert. Accordingly, where that interval has expired and the aircraft is still present, as represented at line 492, a node B alert ensues. This condition may obtain either where aircraft runway movement has been observed with respect to block 478, or otherwise. Accordingly, as represented at line 494, where runway movement has not been detected in conjunction with the inquiry at block 478, then the program jumps to line 488 to determine whether or not the noted threshold dwell interval has been exceeded. Where the determination at block 490 is in the negative, then as represented at line 496 extending to line 476, the program remains in a form of sub-loop awaiting runway movement on the part of the aircraft.

Referring to FIG. 7A, a program flow chart is provided which looks particularly to the exit and crossing activities, for example, carried on by local processors as described conjunction with blocks 60 and 76 in FIG. 1 and the scanners and presence/absence functions associated therewith. The program necessarily looks to both departure and arrival modes of aircraft activity and is seen commencing with a conventional initialization procedure as represented at block 510. From block 510, as represented at line 512, the program proceeds to poll the exit and crossing local processors as represented at block 514. Where these data are not ready, as represented at the inquiry at block 516, then as represented at lines 518 and 520, the program loops until the data have been acquired. As represented at line 522 and block 524, an inquiry then is made as to whether an unidentifiable object has been located. Such an object will be located by the noted presence/absence detectors and will not be seen by the bar code scanning components of the system. Accordingly, where an unidentifiable object has been determined to be present, then as represented at line 526 and node B, a node B alert is instigated. Turning momentarily to FIG. 7B, this node B alert is shown in flow chart fashion. In the figure, node B again appears in conjunction with line 528 leading to block 530. The instructions at block 30 provide for the flashing of appropriate components of the real time map transmitted both to aircraft pilots and to tower personnel. This may show a conflict region as represented, for example, in FIG. 5 or a suitable icon for the designation of an unidentifiable object at a particular region. The routine then continues as represented at block 532 to transmit a warning to the aircraft and, as represented at block 534, to transmit an appropriate visual and audibly perceptible warning to the tower. This routine then exits as represented at line 536 and node A.

Returning to FIG. 7A, node A again reappears in conjunction with line 538 extending, in turn, to line 512 to provide for the return to the program at hand. Where the inquiry at block 524 indicates that no unidentifiable object is present, then as represented at line 540 and block 542, scan data are acquired from the local processors as described in connection with blocks 60 and 76 in FIG. 1. These data will include aircraft identification, vehicle identification, time signature including month, day, year, hour, minute, and second, beam angular position of the vehicle at hand, as well as speed data, direction, and an updating of aircraft or vehicles at turn-offs or cross-overs. The program then continues to the inquiry at block 544 where it is determined whether or not the bar code of the identified vehicle represents an aircraft or a ground vehicle. Where a ground vehicle hits been detected, then as represented at line 546 and block 548, a ground vehicle icon is selected, and, as represented at block 550, the real time map is updated and transmitted to both tower personnel and aircraft pilots. The program then continues as represented at line 552 to the inquiry at block 554. At this position, a determination is made as to whether the vehicle which has been detected is in a permissible location. If that is the case, then as represented at line 520 leading to line 512, the program loops. Where the vehicle which has been detected is not in a permissible location, then as represented at line 556 and block 558, the vehicle icon on the real time map is flashed to provide a perceptible warning. Additionally, an audibly perceptible warning is presented to the tower as represented at block 560. The program then loops as represented at lines 562, 520, and 512.

Where the inquiry at block 544 indicates that an aircraft is identified, then as represented at line 564 and block 566, an aircraft icon is compiled, and as represented at block 568, the aircraft type data are accessed from host computer memory 90. The program then continues as represented at line 570 and node C.

Referring to FIG. 7C, node C again appears in conjunction with line 572 leading to the inquiry at block 574. This inquiry determines whether or not the detected aircraft is in movement. Where the aircraft is not in movement, then as represented at line 576 and block 578, a steady state icon is elected for the real time map of the airport complex. The program then continues as represented by lines 580 and 582. Where the inquiry at block 574 indicates that the aircraft is moving, then as represented by line 584 and block 586, the aircraft icon is flashed and the program continues as represented at lines 588 and 582 to the instructions at block 590 providing for an updating and transmitting of real time data to the map employed at the tower and at the aircraft under movement. The program then continues as represented at block 592 to access tower data. In this regard, for the operational modes at hand, the traffic controller will have authorized movement across runways, to thresholds, to take-off and various other activities which now art utilized in the control logic for the ground maneuvering of aircraft. The program then continues as represented at block 594 to determine whether or not the aircraft under consideration is in a landing (approach) or take-off (departure) mode. Where a departure or take-off mode is at hand, then as represented at line 596 and block 598, a determination is made as to whether the aircraft under investigation is on the runway as part of a maneuver leading to a crossover taxiway such as that shown at 304 in FIG. 4. Where the aircraft is on such a runway as at 295 in FIG. 4, then as represented at line 600 and block 602, a determination is made as to whether a runway crossing clearance has been granted by the tower-based controller. In the event that it has not, then as represented by line 604 and node B, the program reverts to a node B alert as described in conjunction with FIG. 7B. Where tower crossing clearance has been granted, then as represented at line 606 and block 608, aircraft landing data are accessed to determine the possible conflict with a landing aircraft at the same runway. The program then continues as represented at line 610 and node G.

Referring to FIG. 7D, node G reappears in conjunction with line 612 leading to the inquiry at block 614. At that position, a determination is made as to whether there is conflict with any landing aircraft on the runway under consideration as developed from information in connection with block 598. In the event a conflict is present, then, as represented at line 616 and node B, a node B alert ensues as described in conjunction with FIG. 7B. Where no conflict exists, then as represented at line 618 and block 620, the host computer accesses data describing the nearest aircraft or vehicle on the cross-over and an acceptable speed limit with respect to the closing distance to that entity for the instant aircraft. As represented at block 622, a determination is made in view of the above information as to whether the aircraft taxiway speed is proper. If it is not, then as represented at line 624 and node B, a node B alert is generated as described in connection with FIG. 7B. Where the speed of this aircraft is acceptable, then as represented at line 626 and block 628, a determination is made as to whether a runway presence interval has expired. This interval represents another of those predetermined for the program which simply alert tower and all aircraft that a given aircraft has apparently remained on an active runway for an interval considered unsafe. Thus, an alert is published notwithstanding presence or not of a real emergency. Accordingly, where that interval has expired, then as represented at line 630 and node B, a node B alert is published as described in connection with FIG. 7B. Where the runway presence interval has not expired, then as represented at line 632 and block 634, a determination is made as to whether the runway over which the aircraft under investigation at present has been cleared by that aircraft. This procedure involves, as described above, a determination of the distance from the rearwardly disposed bar code on the aircraft to the end of the aircraft at its tail region in the process of triangulating necessary information. Where the runway has not been cleared by any portion of the aircraft under investigation, then as represented by line 636, the program enters a minor loop to line 626 to await the clearance of the runway or the expiration of the runway presence interval. Where the runway has been cleared, then as represented at line 638 and block 640, a determination is made as to whether the aircraft under investigation has reached a second runway for the dual parallel runway example of FIG. 5. Where it has, then as represented at line 642 and node A, the program returns to its entry as represented in FIG. 7A at node A, as shown in combination with lines 538 and 512. Where the determination at block 640 shows that no second runway is involved, then the routine progresses as represented at line 644 and node F.

Returning to FIG. 7C, node F again is reproduced in conjunction with line 646. Line 646 is seen directed to line 648 representing a negative determination as to whether the aircraft is on a runway. In the event of such a negative determination, then as represented at block 650, a determination is made as to whether the aircraft is on a cross-over taxiway as represented, for example, at 304 in FIG. 4. Where the aircraft is not on such a crossover, then the program loops as represented by line 652 leading to line 596 and the inquiry at block 598. Where the determination represented at block 650 is in the affirmative and an aircraft is on a cross-over taxiway, then as represented at line 654 and block 656, the location of the nearest aircraft or vehicle on the crossover taxiway in question is accessed. Next, as represented at block 658, the distance to the next runway toward which the present aircraft is moving is derived. Then, as represented at block 660, an acceptable taxiing speed limit for the aircraft under evaluation is derived with respect to the closing distance to the next runway and/or aircraft or vehicle on the cross-over. The program then continues as represented at line 662 and node H.

Figure 7E:
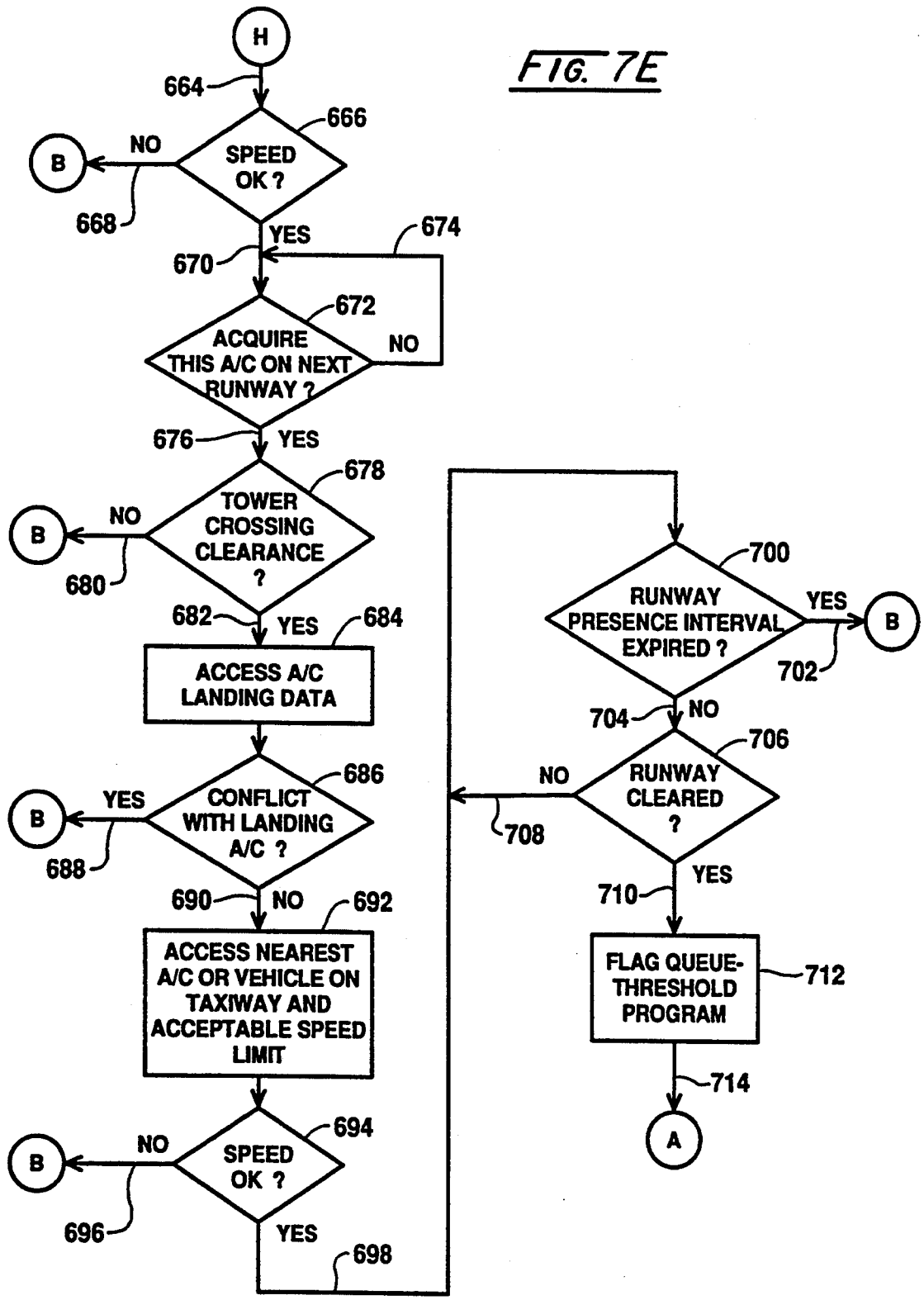

Node H reappears in FIG. 7E in conjunction with line 664 leading to the inquiry at block 666. This inquiry determines whether or not the speed of the aircraft on the taxiway is acceptable. In the event it is not, then as represented at line 668 and node B, a node B alert is undertaken as described in connection with FIG. 7B. Where the aircraft speed is acceptable, then as represented at line 670 and block 672, a determination is made as to whether the aircraft being monitored has reached a next runway, for example runway 294 resulting from the course of its travel along cross-over taxiway 304 as described in connection with FIG. 4. Where the aircraft has not reached that next runway, then a minor loop ensues as represented by line 674 extending to line 670. Where the aircraft being monitored has reached the next runway, for example runway 294 as described in connection with FIG. 4, then the program looks to the inquiry represented at block 678 determining whether a runway crossing clearance has been received from the air controller at the tower location. Where no such crossing clearance has been obtained, then as represented at line 680 and node B, a node B alert is instigated and propagated as described in connection with FIG. 7B. Where crossing clearance has been obtained with respect to the instant aircraft, then as represented at line 682 and block 684, any information as to aircraft which may be landing on the runway being crossed by the instant aircraft is accessed. The program then inquires as represented at block 686 as to whether a conflict with such landing aircraft will exist. Where that is the case, then as represented at line 688 and node B, a node B alert is entered into as described in conjunction with FIG. 7B. Where no conflict is at hand, then as represented at line 690 and block 692, the program accesses information as to the nearest aircraft or vehicle on the next taxiway toward which the present aircraft is headed. Additionally, the program accesses an acceptable value for the speed limit for the instant aircraft on that taxiway. The present information may, for example, be described in conjunction with FIG. 4 as an aircraft having crossed over runway 294 on taxiway 304 which is about to enter taxiway 306. The program then determines whether the speed of the instant aircraft is acceptable as represented at block 694. Where the speed of the aircraft is unacceptable, then as represented at line 696 and node B, a node B alert ensues as described in conjunction with FIG. 7B. In the event the speed of the instant aircraft is acceptable, then as represented at line 698 and block 700, a determination is made as to whether the predetermined runway presence interval has expired. As before, this is a preset interval selected as the maximum period of time which any aircraft should be present on a runway during a crossover maneuver. Where the interval is excessive, then as represented at line 702 and node B, a node B alert ensues as described in conjunction with FIG. 7B. Where the runway presence interval has not expired, then an inquiry is made as whether the instant aircraft has cleared the runway in question. Where it has not, then as represented at lines 708 and 698, a minor loop ensues until the aircraft has cleared the runway. It may be noted that this condition will obtain until such time as the presence interval has expired.

Where the runway has been cleared by the instant aircraft within the presence interval criterion, then as represented at line 710 and block 712, a queue threshold program is flagged, inasmuch as the aircraft may well be entering a queue or sequence of aircraft awaiting clearance to move to a given runway threshold for take-off. The program then proceeds as represented by line 714 and node A to return to node A and lines 538 and 512 as described in FIG. 7A.

Figure 7F:
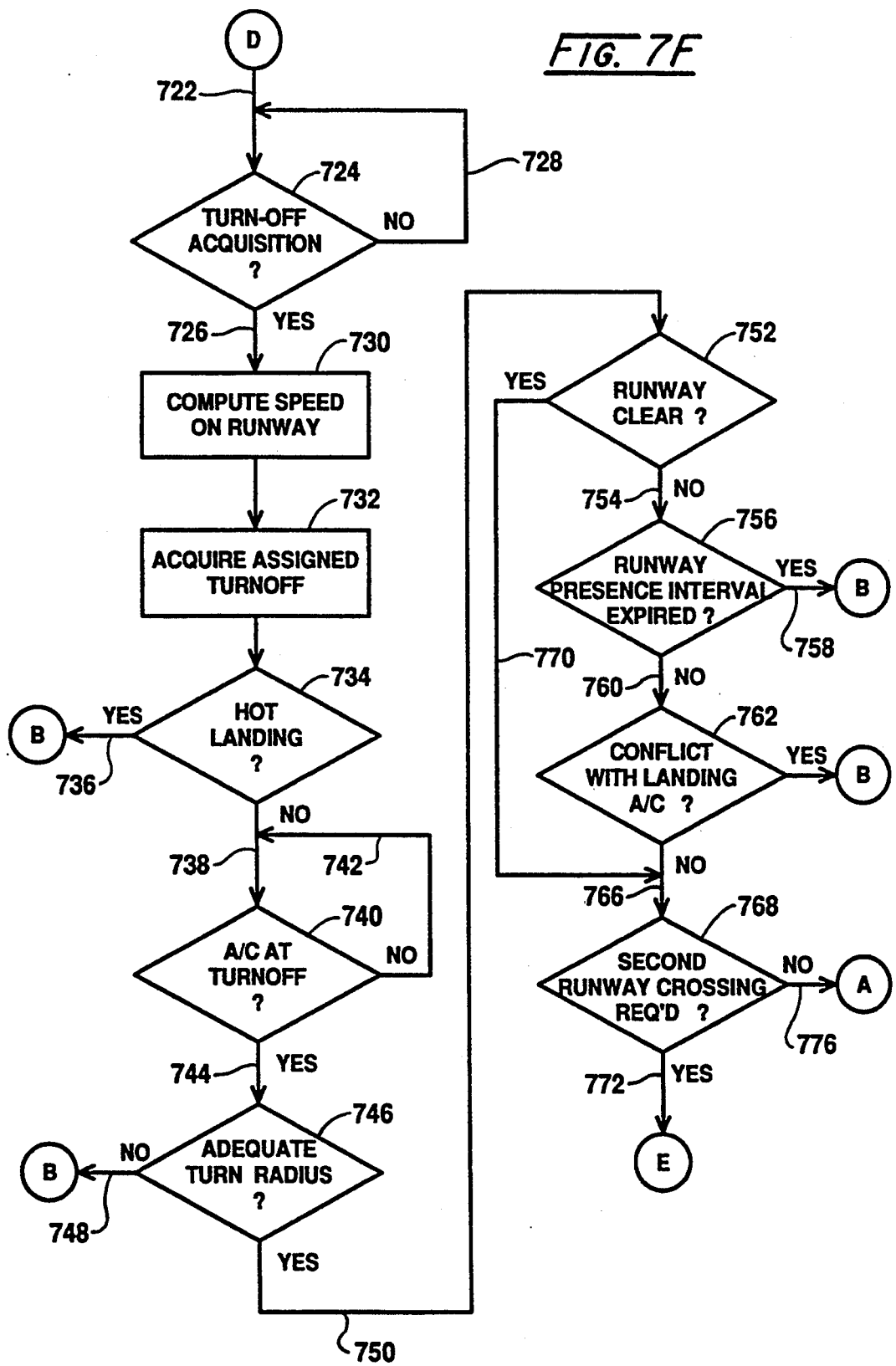

Returning to FIG. 7C and the inquiry at block 594, where the aircraft being monitored has been determined to be in a landing mode, then the program proceeds as represented at line 720 and node D. Node D reappears in FIG. 7F in conjunction with line 722 leading to the inquiry at block 724. In this regard, where a landing aircraft has reached a turn-off position and has been acquired by a scanner, then the program proceeds as represented at line 726. For example, returning to FIG. 4, where an aircraft landing on runway 16R has turned off on high speed taxiway 320, that information would be acquired. Returning to FIG. 7F, where the information from one of the scan turn-off is not yet available, then the program enters into a minor loop as represented by line 728 extending to line 722. Where turn-off acquisition has been made by a scanning device, then as represented at line 726 and block 730, a computation is made as to the aircraft speed in the vicinity of the turn-off on the runway. The program then acquires tower assigned turn-off for the aircraft as represented at block 732. A determination then is made with respect to the computed runway speed as to whether a "hot" landing for the instant aircraft is at hand as represented by the inquiry at block 734. Where a hot landing is imminent, then as represented at line 736 and node B, a phase B alert is instigated as described in conjunction with FIG. 7B. Where a hot landing is not imminent, then as represented at line 738 and block 740, a determination is made as to whether the aircraft is at its assigned turnoff. Where that is not the case, then as represented at line 742, the program enters a minor loop awaiting the aircraft's presence at its assigned turn-off. Where the aircraft is determined to be present at that turn-off by an appropriately positioned scanner, then as represented at line 744 and block 746, a determination is made as to whether the aircraft data indicates that an appropriate turning radius is available for the turn-off anticipated. Where it is not, then as represented at line 748 and node B, a node B alert ensues as described in conjunction with FIG. 7B. Where adequate turning capability is present for the instant aircraft, then as represented at line 750 and block 752, a determination is made as to whether the aircraft being investigated has cleared the runway and is now on an exiting taxiway. Where that is not the case, then as represented at line 754 and block 756, a determination is made as to whether a runway presence interval has expired. This interval is that interval from essentially a first scanner detection near the landing position to the instant scanner and is predetermined to indicate that an alert should be sounded notwithstanding the absence or presence of a genuine emergency condition. Accordingly, where that interval has expired and the runway is not clear, then as represented at line 758 and node B, the program enters a node B alert condition and proceeds as described in connection with FIG. 7B. Where the runway presence interval has not expired, then as represented at line 760 and block 762, a determination is made as to whether any on runway conflicts are present with respect to any other landing aircraft. Where that is the condition, then as represented at line 764 and node B, a node B alert ensues as described in conjunction with FIG. 7B. Where no such conflict exists, then as represented at line 766 and block 768, a determination is made as to whether a second runway crossing is required. This second runway crossing determination also is made directly where the inquiry at block 752 indicates that the aircraft being monitored has cleared the runway upon which it has landed. Thus, upon an affirmative determination at block 752, as represented at line 770, the program proceeds as represented at line 766 and block 768. Where a second runway crossing is contemplated, then the program proceeds as represented by line 772 and node E. Looking momentarily to FIG. 7C, node E reappears in conjunction with line 774 leading to line 596 and the inquiry at block 598. Returning to FIG. 7F, were a second runway crossing is not required, then as represented at line 776 and node A, the program returns to FIG. 7A and lines 538 and 512.

Now considering the scanners employed with the instant system, readily available laser scanning instruments can be re-engineered for the purposes of the present system. For example, a model 610EF optical system marketed by Lazer Data Corporation may be contemplated by those skilled in the art. This system consists of a polygon laser scanner and a decoder/controller unit which interfaces with a host computer for configuring the system and acquiring, processing, and handling developed data. Considering the enhancement of such devices, the laser beam size and anticipated target in the diameter of the transmitting objects are related by Gaussian beam propagation characteristics. In this regard, the output of a well-behaved laser can be approximated by a Gaussian spherical wave (i.e., a spherical wavefront with a Gaussian amplitude distribution in a plane perpendicular to the propagation vector). The propagation (diffraction) characteristics are such that every Gaussian spherical wave can be traced backwards (or forward) to a unique real or virtual waist at a unique axial position.

The radius (radial position where the intensity has fallen to $1/e^2$ of its peak value) of the Gaussian laser beam at an arbitrary distance, z, from the beam waist is given by:

$$w(z) = \text{spot size} = w_0 \sqrt{1 + \frac{\lambda z}{\pi w_0^2}} \quad (1)$$

where $w_0$ = waist spot size and $$R(z) = \text{radius of curvature} = z\left(1 + \left(\frac{Z_R}{z}\right)\right)^2$$

where $Z_R$ = Rayleigh Range = $\pi w_0^2/\lambda$

Now considering the configuration and parameters governing radiometric power transfer between two surface elements, the power transfer equation pertinent to the present investigation may be written as:

$$dP = L\, dA_1 \cos\theta_1\, dA_2 \cos\theta_2/r_{12} \quad (2)$$

where L is the radius of the source; $dA_1$ is the area of the receiver collecting aperture; $\theta_1$ is the angle the receiver makes with the line connecting the receiver and the target; $dA_2$ is the illuminated area of the target; $\theta_2$ is the angle the target makes with the line connecting the receiver and the target; and $r_{12}$ is the distance between the target and the receiver. Substituting $d\Omega_1 = dA_1 \cos\theta_1/r_{12}^2$ and noting that the area of the beam at the target is given by, $dA_{beam} 32\, dA_2 \cos\theta_2$, equation (2) can be written as:

$$dP = L\Omega_1 dA_{beam} \quad (3)$$

If it is assumed that the radiance, in the retro-direction, of the bar target material is some factor, m, greater than that of a Lambertian reflector, and if another factor, T, is included for the attenuation of the beam due to the transmission of the objects, atmospheric absorption, etc., the following expression may be written:

$$L = (mT)\left(\frac{M}{\pi}\right) \quad (4)$$

where $M = P_0/(dA_{beam}/\cos\theta_2)$ is the irradiance on the target. Since $d\Omega_1 = \pi(D/2r_{12})^2$, the following expression may be written:

$$dP = P_0(\cos\theta_2)(m\, T\, D^2/(2\, r_{12})^2 \quad (5)$$

where D is the aperture diameter for the common sending and receiving optics.

Assuming the backscatter enhancement due to a highly reflective target material is given by m = 200 and the optical attenuation is given by T = 0.25, the radiometric parameter for a scanning system may be tabulated as follows:

| | |
|---|---|
| Laser Power ($P_0$) | 1.0 W |
| Aperture Diameter (D) | 21.0 mm |
| Range ($r_{12}$) | 500 ft. |
| Orientation of Target ($\theta_2$) | 60° |
| Power on Detector (dP) | $4.8 \times 10^{-7}$ W |

The above calculations indicate that one watt of power is adequate for an airport complex installation as now contemplated.

One-watt solid-state diode lasers operating in the eye-safe wavelength region of 1.5 microns are currently available with adequate reliability. This wavelength region exhibits good transmission through haze and provides some advantages for transmission through fog, compared to visible radiation. A laser at 1.5 microns also has good transmission through atmospheric gases in that it misses the main water vapor absorption line at 1.46 microns. See in this regard: A. Arnulf, et al., "Transmission by Haze and Fog in the Spectral Region from 0.35 to 10 Microns", Journal of the Optical Society of America, 47, 491–498, 1957. Detectors are available in this wavelength range with adequate sensitivity, requiring received powers of as little as a few tenths of a nanowatt.

Since certain changes may be made in the above-described system, method and apparatus without departing from the scope of the invention herein involved, it is intended that all matter contained in the description thereof or shown in the accompanying drawings shall be interpreted as illustrative and not in a limiting sense.

I claim:

1. A surface detection system for monitoring the positions of pilot operated aircraft while moving on the surface of an airport facility having a control tower, two runways having thresholds and taxiways accessing said thresholds and crossing taxiways extending between said runways, comprising:
   a machine readable code positioned upon and uniquely identifying said aircraft;
   a threshold scanner assemblage positioned for scanning the threshold of each said runway to derive first scan signals corresponding with said machine readable code and the location of a scanned aircraft;
   a taxiway scanner assemblage positioned for scanning select locations of said taxiways to derive second scan signals corresponding with said machine readable code and the location of a said scanned aircraft;
   transmission means for conveying said first and second scan signals;
   a display at said control tower responsive to input signals for displaying the location of said scanned aircraft;
   a memory retaining accessible aircraft identifying data corresponding with each said code; and
   control means responsive to said first and second scan signals for accessing said aircraft identifying data and generating said display input signals.

2. The system of claim 1 including:
   a runway scanner assemblage positioned for scanning said runways at said crossing taxiways extending between said runways to derive third scan signals corresponding with said machine readable code and the location of a said scanned aircraft: and
   said control means is responsive to said third scan signals for accessing said aircraft identifying data and generating said display input signals representing the location of said scanned aircraft with respect to its location in relation to said runway and said crossing taxiway.

3. The system of claim 2 in which:
   said control means is responsive to said first and third scan signals for deriving aircraft position and movement data therefrom and generating an alert output signal in the presence of an incipient condition for collision of said scanned aircraft and for transmitting said alert output signal to said display; and
   said display is responsive to said alert output signal for displaying an alert symbol in correspondence therewith.

4. The system of claim 1 in which said machine readable code is a bar code and said threshold scanner assemblage includes an optical beam scanner located adjacent said threshold of each said runway.

5. The system of claim 1 in which said threshold scanner assemblage is an optical beam scanner having a code output signal corresponding with said machine readable code and the position of said scanned aircraft, and includes a local processor responsive to said code output signal for deriving the identifying number of said scanned aircraft, the time of said scan, the location of said scanned aircraft and the speed and direction of movement thereof as said first scan signals.

6. The system of claim 1 in which:
   said taxiway scanner assemblage includes a presence/absence detector responsive to the presence of an object at a predetermined region of said taxiway having no said machine readable code and deriving an unidentifiable object signal; and
   said control means is responsive to said unidentifiable object signal to derive a said display input signal representing said object and the location thereof.

7. The system of claim 1 in which:
   said threshold scanner assemblage is an optical beam scanner having a beam output and responsive to an information input signal to modulate said beam output in correspondence therewith;
   including an optical responsive receiver mounted upon said aircraft responsive to said modulated beam output to derive received signals;
   a display within said aircraft responsive to said received signals to provide a visually perceptible display;
   said memory includes map data representing the layout of said airport facility including said runways and taxiways; and
   said control means is responsive to said map data, said first and second scan signals to effect said beam modulation to derive said received signals effecting display of a map of said airport facility and the display of the location of said scanned aircraft thereon.

8. A method for monitoring the position of pilot operated aircraft while moving on the surface of an airport facility having a control tower, a runway with a threshold and a turn-off location and taxiway surfaces accessing said threshold and turn-off location, comprising the steps of:

providing a machine readable code at a predetermined location on and uniquely identifying said aircraft;

accessing said aircraft bar code by carrying out the scanning of said airport surface at said threshold and turn-off location to derive scan signals corresponding with said machine readable code;

providing a memory for retaining aircraft identifying data corresponding with each said code;

accessing said memory in response to said scan signals to identify said aircraft and its position on said airport surface; and providing a visually perceptible indication of said aircraft identity and position at said control tower.

9. The method of claim 8 in which said visually perceptible indication is provided as a real time map display of said airport facility showing said aircraft by a select indicia.

10. The method of claim 8 in which said machine readable code is provided as a bar code corresponding with the tail number of said aircraft.

11. The method of claim 8 in which said scanning of said airport surface is carried out by optical beam scanners positioned at predetermined locations of said airport facility.

12. The method of claim 11 in which said scanners are positioned adjacent said runway threshold and turn-off location.

13. The method of claim 8 including the step of providing within said pilot operated aircraft an indication of said aircraft and its position as a real time map display of said airport facility showing said aircraft as a select indicia.

14. The method of claim 8 including the step of determining the location, direction of movement and speed of two said aircraft from said scan signals and providing a perceptible alert at said control tower in the presence of an incipient condition for collision of said aircraft.

15. The method of claim 8 including the steps of:
providing a presence/absence detector at said turn-off location responsive to the presence of an object thereat having no said machine readable code by deriving an unidentifiable object signal; and
providing a visually perceptible indicator of the location of said object at said control tower.

16. A surface detection system for monitoring the position of pilot operated aircraft while moving on the surface of an airport facility having a control tower, a runway, a runway turn-off and a taxiway for accessing said runway and runway turn-off, comprising:
a machine readable code positioned upon and uniquely identifying said aircraft;
a runway turn-off scanner assemblage positioned for scanning said runway at said turn-off to derive first scan signals corresponding with said machine readable code and the location of a scanned aircraft;
a taxiway scanner assemblage positioned for scanning select locations of said taxiway to derive second scan signals corresponding with said machine readable code and the location of said scanned aircraft;
transmission means for conveying said first and second scan signals;
a display at said control tower responsive to input signals for displaying the location of said scanned aircraft;
a memory retaining accessible aircraft identifying data corresponding with each said code; and
control means responsive to said first and second scan signals for accessing said aircraft identifying data and generating said display input signals.

17. The system of claim 16 in which said control means is responsive to said first and second scan signals for deriving aircraft position and movement data therefrom and generating an alert output signal in the presence of an incipient condition for collision of said scanned aircraft and for transmitting said alert output signal to said display; and
said display is responsive to said alert output signal for displaying an alert symbol in correspondence therewith.

18. The system of claim 16 in which said machine readable code is a bar code and said runway turn-off scanner assemblage and said taxiway scanner assemblage include an optical beam scanner respectively located adjacent said runway turn-off and adjacent said taxiway remote from said runway turn-off scanner assemblage.

19. The system of claim 16 in which said runway turn-off scanner assemblage is an optical beam scanner having a code output signal corresponding with said machine readable code and the position of said scanned aircraft, and includes a local processor responsive to said code output signal for deriving the identifying number of said scanned aircraft, the time of said scan, the location of said scanned aircraft and the speed and direction of movement thereof as said first scan signals.

20. The system of claim 16 in which:
said runway turn-off scanner assemblage is an optical beam scanner having a beam output and responsive to an information input signal to modulate said beam output in correspondence therewith;
including an infrared responsive receiver mounted upon said aircraft responsive to said modulated beam to derive received signals;
a display within said aircraft responsive to said received signals to provide a visually perceptible display visually;
said memory includes map data representing the layout of said airport facility including said runways and taxiways; and
said control means is responsive to said map data, said first and second scan signals to effect said beam modulation to derive said received signals effecting display of a map of said airport facility and the display of the location of said scanned aircraft thereon.

21. A detection system for monitoring the positions of pilot operated aircraft having a lower disposed surface while airborne over and adjacent to the approach portion of a runway during a landing at an airport facility having a control towering procedure, comprising:
a machine readable code positioned upon said lower disposed surface and uniquely identifying said aircraft;
a scanner assemblage positioned adjacent said runway in the vicinity of said approach portion for scanning generally vertically over said runway to derive scan signals corresponding with said machine readable code and the location of a scanned aircraft over said runway;
transmission means for conveying said scan signals;
a display at said control tower responsive to input signals for displaying the location and identification of said scanned aircraft;

a memory retaining accessible aircraft identifying data corresponding with each said code; and control means responsive to said scan signals for accessing stud aircraft identifying data and generating said display input signals.

22. The system of claim 21 in which said machine readable code is a bar code and said scanner assemblage includes an infrared beam scanner.

23. The system of claim 21 in which said scanner assemblage is an infrared beam scanner having a code output signal corresponding with said machine readable code and the position of said aircraft, and includes a local processor responsive to said code output signal for deriving the identifying number of said scanned aircraft, the time of said scanning, the position and altitude of said scanned aircraft and the direction of movement thereof as said scan signals.

* * * * *